(12) United States Patent
Sabe et al.

(10) Patent No.: US 7,437,214 B2
(45) Date of Patent: Oct. 14, 2008

(54) ROBOT DEVICE AND METHOD OF CONTROLLING THE SAME

(75) Inventors: Kohtaro Sabe, Tokyo (JP); Takeshi Ohashi, Kanagawa (JP); Kenta Kawamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 814 days.

(21) Appl. No.: 10/515,854

(22) PCT Filed: Mar. 24, 2004

(86) PCT No.: PCT/JP2004/004056

§ 371 (c)(1),
(2), (4) Date: Nov. 24, 2004

(87) PCT Pub. No.: WO2004/085121

PCT Pub. Date: Oct. 7, 2004

(65) Prior Publication Data

US 2005/0222709 A1    Oct. 6, 2005

(30) Foreign Application Priority Data

Mar. 27, 2003   (JP)   ............................... 2003-087682

(51) Int. Cl.
*G06F 19/00* (2006.01)
(52) U.S. Cl. ........................ 700/245; 700/246; 700/251; 700/260; 700/261; 318/568.1; 318/568.12; 318/568.16; 318/568.17; 318/568.2; 901/1; 901/9; 901/46

(58) Field of Classification Search .................. 700/245, 700/246, 251, 260, 261; 318/568.1, 568.12, 318/568.16, 568.17, 568.2; 901/1, 9, 46
See application file for complete search history.

(56) References Cited

U.S. PATENT DOCUMENTS

| | | | |
|---|---|---|---|
| 5,974,366 A | 10/1999 | Kawai et al. | |
| 6,876,903 B2 * | 4/2005 | Takenaka | ...................... 700/245 |
| 6,920,374 B2 * | 7/2005 | Takenaka et al. | ............ 700/245 |
| 6,922,609 B2 * | 7/2005 | Takenaka et al. | ............ 700/245 |
| 7,054,718 B2 * | 5/2006 | Miyamoto et al. | ........... 700/258 |
| 7,061,200 B2 * | 6/2006 | Iribe | ....................... 318/568.16 |
| 7,099,747 B2 * | 8/2006 | Mikami et al. | .............. 700/245 |

FOREIGN PATENT DOCUMENTS

| | | |
|---|---|---|
| EP | 1 053 835 | 11/2000 |
| JP | 10-175180 | 6/1998 |
| JP | 10-277969 | 10/1998 |
| JP | 2002-326173 | 11/2002 |
| JP | 2003-136439 | 5/2003 |
| JP | 2004-90112 | 3/2004 |
| JP | 2004-148499 | 5/2004 |

* cited by examiner

*Primary Examiner*—Khoi H. Tran
*Assistant Examiner*—McDieunel Marc
(74) *Attorney, Agent, or Firm*—Frommer Lawrence & Haug LLP; William S. Frommer

(57) ABSTRACT

A legged mobile robot can calculate the movement amount between a portion of the robot apparatus that had been in contact with a floor up to now and a next portion of the robot apparatus in contact with the floor using kinematics and to switch transformation to a coordinate system serving as an observation reference as a result of the switching between the floor contact portions.

20 Claims, 17 Drawing Sheets

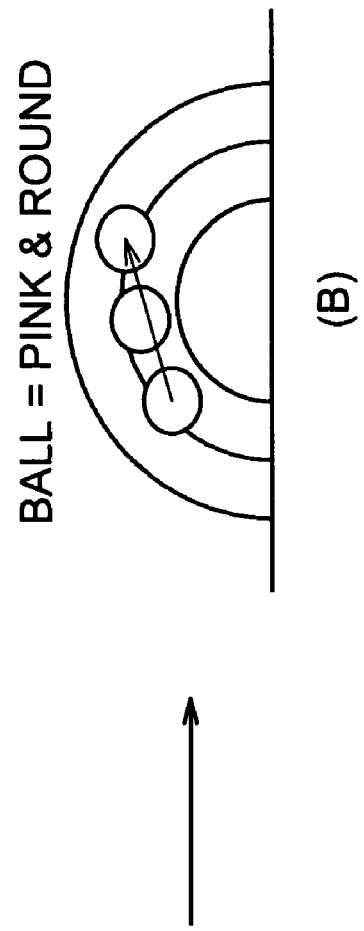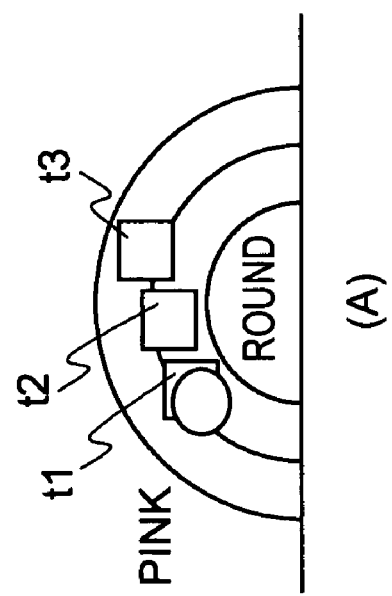
FIG. 13

POSTURE OF FOOT IN
CONTACT WITH FLOOR : wTlf(t)

wV(t+1)=wTlf(t)xlfTb(t+1)xbTs(t+1)xsV(t+1)
wV(t+2)=wTlf(t)xlfTb(t+2)xbTs(t+2)xsV(t+2)
wV(t+3)=wTlf(t)xlfTb(t+3)xbTs(t+3)xsV(t+3)

FOOT LANDS  POSTURE OF FOOT IN
ON FLOOR   CONTACT WITH FLOOR :
           wTrf(t+4)=wTlf(t)xlfTrf(t+4)

MOVEMENT  lfTrf(t+4)
AMOUNT :

wV(t+5)=wTrf(t+4)xrfTb(t+5)xbTs(t+5)xsV(t+5)
wV(t+6)=wTrf(t+4)xrfTb(t+6)xbTs(t+6)xsV(t+6)
wV(t+7)=wTrf(t+4)xrfTb(t+7)xbTs(t+7)xsV(t+7)

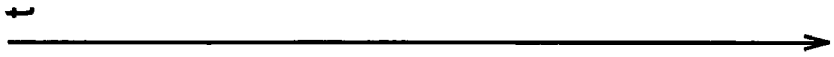
FOOT LANDS ON FLOOR t

FIG. 14

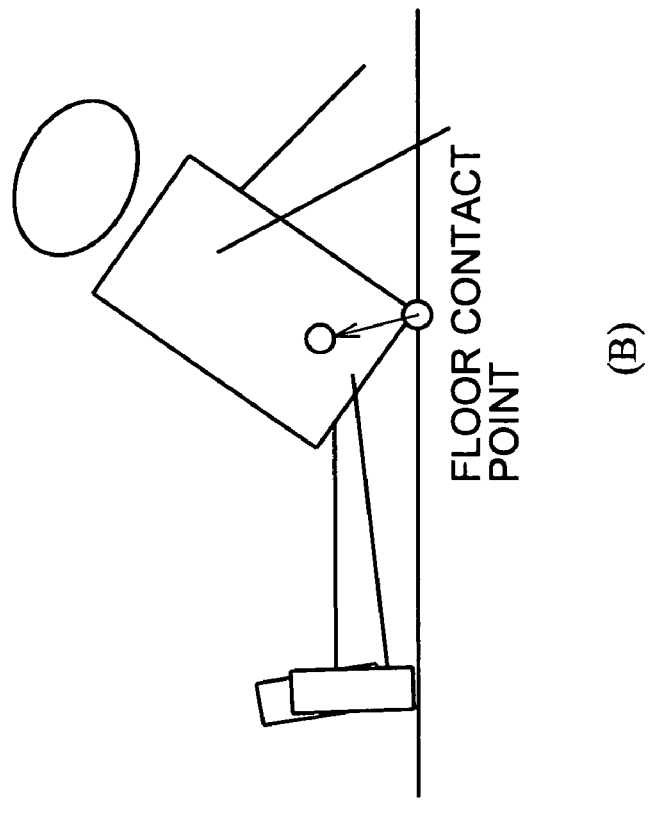
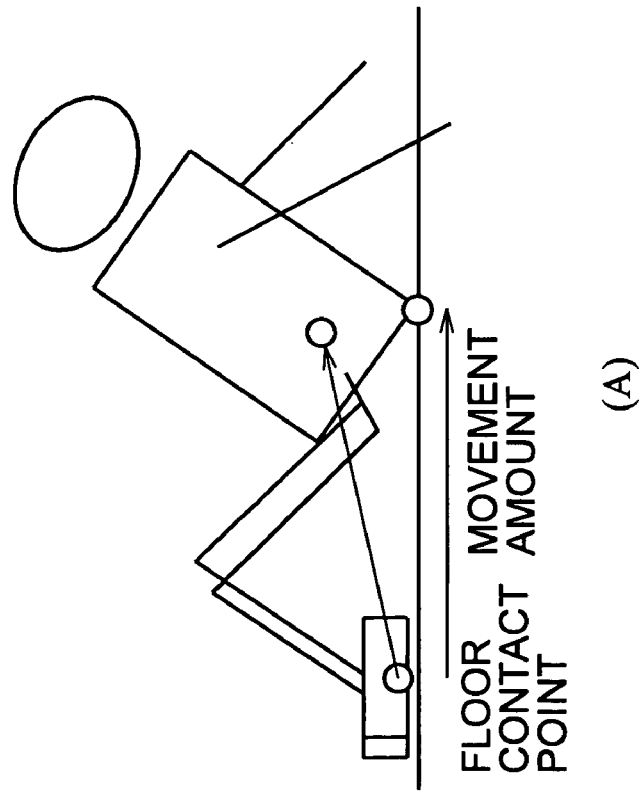
FIG. 16

ROBOT DEVICE AND METHOD OF CONTROLLING THE SAME

BACKGROUND OF THE INVENTION

1. Technical Field

The present invention relates to a robot apparatus and a method for controlling the robot apparatus, and can be applied to, for example, a legged mobile robot. The present invention makes it possible to precisely express an observation object by calculating the movement amount between a portion of the robot apparatus that had been in contact with a floor up to now and a next portion of the robot apparatus in contact with the floor using kinematics and by switching transformation to a coordinate system serving as an observation reference as a result of the switching between the floor contact portions. In addition, the present invention makes it possible to precisely express an observation object by applying such operations to the movement amount of a separately detected reference coordinate system.

2. Background Art

Hitherto, a walking intelligent robot which moves autonomously by perceiving an obstacle has been proposed as in, for example, Japanese Unexamined Patent Application Publication No. 2000-317868. In such a robot, as shown in FIG. 1, an obstacle, or the like, detected with reference to a sensor mounting position P1 is processed by a robot center coordinate system (whose origin is represented by P2 in FIG. 2) serving as a robot processing reference. Therefore, in this type of robot, an observation result is expressed using a change in orientation of the robot from the robot central coordinate system to a sensor.

In such a robot, when the origin P2 of the robot center coordinate system moves as a result of walking of the robot as indicated by an arrow a, a coordinate of the observation result based on the robot center coordinate system is corrected by the movement amount, and the movement amount is determined from a pace of the robot by each movement command.

As shown in FIG. 2, such a robot walking with two legs is also proposed. In such a robot also, an observation object detected by a sensor is expressed by a robot center coordinate system whose origin is P2.

Such walking of a robot is executed by separately issuing a command to a corresponding module. In contrast, the actual movement of the robot is continuously executed. Therefore, an observation result expressed by the robot central coordinate system includes an error caused by the pace. In addition, there is a difference between the command issue time and the actual movement time. Therefore, related robots do not precisely express the observation result detected by a sensor.

Such error is not particularly a problem in, for example, a robot which selects a movement on the basis of a new observation, in which an observation result is directly connected to the movement as in subsumption architecture. However, when observation results obtained at various times are processed by combining them, for example, the robot may fail to avoid an obstacle. As a result, in this case, the error becomes a serious problem. In particular, as shown by changes in orientation by swing walking of a robot in FIGS. 3(A) to 3(C), when the robot swings through an angle of 60 degrees in taking one step from the time the right leg floats and to the time it lands on the floor, an observation result during the swinging (which is the observation result indicated by a time t2) becomes indeterminate. When observation results are processed by combining them, this may become a serious problem. FIG. 3 shows the result of combining observation results by a world coordinate system (indicated by W). The observation results at a movement start time t1 and a movement completion time t3 can be determined as those of the same object by the rotational angle, whereas the observation result between these times cannot be easily determined as that of the same object.

DISCLOSURE OF INVENTION

The present invention is achieved in view of the aforementioned points, and provides a robot apparatus capable of expressing an observation object with greater precision than related robots and a method for controlling the robot apparatus.

To overcome the aforementioned problems, the present invention is applied to a robot apparatus comprising a main body, a plurality of movable portions connected to the main body, a reference coordinate system disposed at the main body, a first local coordinate system disposed at a first floor contact position where one of the movable portions contacts a floor, first movement amount calculating means for calculating a movement amount of the reference coordinate system on the basis of the first local coordinate system, a second local coordinate system disposed at a second floor contact position where another one of the movable portions contacts the floor, second movement amount calculating means for calculating a movement amount of the reference coordinate system on the basis of the second local coordinate system, and calculating means for calculating the distance between the first local coordinate system and the second local coordinate system. A movement amount of the reference coordinate system is calculated on the basis of the movement amount of the reference coordinate system based on the first local coordinate system, the movement amount of the reference coordinate system based on the second local coordinate system, and the distance between the local coordinate systems. Here, the term "main body" refers to a part of the body of the robot where the reference coordinate system is set. Ordinarily, this corresponds to, for example, the waist, which is a main portion of the robot. However, if the reference coordinate system is set at the head, the term "main body" refers to the head. The use of the term "main body" is not limited to these parts of the body.

According to the structure of the present invention, the robot apparatus comprises a main body, a plurality of movable portions connected to the main body, a reference coordinate system disposed at the main body, a first local coordinate system disposed at a first floor contact position where one of the movable portions contacts a floor, first movement amount calculating means for calculating a movement amount of the reference coordinate system on the basis of the first local coordinate system, a second local coordinate system disposed at a second floor contact position where another one of the movable portions contacts the floor, second movement amount calculating means for calculating a movement amount of the reference coordinate system on the basis of the second local coordinate system, and calculating means for calculating the distance between the first local coordinate system and the second local coordinate system. A movement amount of the reference coordinate system is calculated on the basis of the movement amount of the reference coordinate system based on the first local coordinate system, the movement amount of the reference coordinate system based on the second local coordinate system, and the distance between the local coordinate systems. Therefore, it is possible to calculate the movement amount of the reference coordinate in accordance with the floor contact position while successively calculating the movement amount from the first or the second floor contact position using kinematics. By this, even if the orientation changes by a separately output command, and even if, for example, the robot swings considerably by one such command, it is possible to express an object related to the reference coordinate more precisely than related robots. By this, it is possible to express an observation object more precisely than related robots by precisely expressing an observation result detected by a sensor.

The present invention is applied to a robot apparatus in which a dynamic change occurs between floor landing positions by an orientation change. The robot apparatus comprises observing means for observing an outside environment via an outside observation sensor and outputting an observation result by a sensor coordinate system corresponding to the outside observation sensor, orientation detecting sensors for detecting the angles of joints involved in the orientation change among at least joints disposed from the outside observation sensor to the floor landing positions, floor landing detecting means for detecting switching between the floor landing positions, and coordinate transforming means for transforming a coordinate of the observation result obtained from the observing means to a coordinate of a predetermined reference coordinate system. The observing means successively outputs the coordinate of the observation result changing by the orientation change along with time information. The coordinate transforming means detects a movement amount with respect to the floor landing position changing by the orientation change from the results of detection by the orientation detecting sensors with reference to the time information of the observation result and transforms the coordinate of the observation result to the coordinate of the reference coordinate system by correction by the movement amount in order to switch the floor landing position used for the detection of the movement amount as a result of the detection of the switching between the floor landing positions by the floor landing detecting means.

According to the structure of the present invention, the robot apparatus in which a dynamic change occurs between floor landing positions by an orientation change comprises observing means for observing an outside environment via an outside observation sensor and outputting an observation result by a sensor coordinate system corresponding to the outside observation sensor, orientation detecting sensors for detecting the angles of joints involved in the orientation change among at least joints disposed from the outside observation sensor to the floor landing positions, floor landing detecting means for detecting switching between the floor landing positions, and coordinate transforming means for transforming a coordinate of the observation result obtained from the observing means to a coordinate of a predetermined reference coordinate system. The observing means successively outputs the coordinate of the observation result changing by the orientation change along with time information. The coordinate transforming means detects a movement amount corresponding to the outside observation sensor and with respect to the floor landing position changing by the orientation change from the results of detection by the orientation detecting sensors with reference to the time information of the observation result and transforms the coordinate of the observation result to the coordinate of the reference coordinate system by correction by the movement amount in order to switch the floor landing position used for the detection of the movement amount as a result of the detection of the switching between the floor landing positions by the floor landing detecting means. Therefore, the coordinate of the observation result is corrected by a calculated movement amount and transformed to the reference coordinate while successively calculating the movement amount between a portion of the robot apparatus that had been in contact with the floor up to now and a next portion of the robot apparatus in contact with the floor using kinematics. By this, even if the orientation changes by a separately output command, and, for example, the robot swings considerably by one such command, it is possible to express an observation object more precisely than related robots. By executing these operations with reference to time information relating to the observation result, even if there is a difference between the command issue time and the actual movement time, it is possible to precisely express the observation result detected by the sensor. Consequently, it is possible to express an observation object more precisely than related robots.

The present invention is applied to a robot apparatus comprising a trunk, a plurality of movable legs connected to the trunk, a reference coordinate system disposed at the trunk, a first local coordinate system disposed at a first floor contact position where one of the movable legs contacts a floor, first movement amount calculating means for calculating a movement amount of the reference coordinate system on the basis of the first local coordinate system, a second local coordinate system disposed at a second floor contact position where another one of the movable legs contacts the floor, second movement amount calculating means for calculating a movement amount of the reference coordinate system on the basis of the second local coordinate system, and calculating means for calculating the distance between the first local coordinate system and the second local coordinate system. A movement amount of the reference coordinate system is successively calculated on the basis of the movement amount based on the first local coordinate system, the movement amount based on the second local coordinate system, and the distance between the local coordinate systems due to switching between the movable legs that contact the floor.

By virtue of the structure of the present invention, it is possible to provide a robot apparatus having a plurality of movable legs and capable of expressing an observation object more precisely than related robot apparatuses.

The present invention is applied to a method for controlling a robot apparatus comprising a main body and a plurality of movable portions connected to the main body. The method comprises a first movement amount calculating step for calculating a movement amount of a reference coordinate system disposed at the main body on the basis of a first local coordinate system disposed at a first floor contact position where one of the movable portions contacts a floor, a second movement amount calculating step for calculating a movement amount of the reference coordinate system on the basis of a second local coordinate system disposed at a second floor contact position where another one of the movable portions contacts the floor, and a distance calculating step for calculating the distance between the first local coordinate system and the second local coordinate system. A movement amount of the reference coordinate system is calculated on the basis of the movement amount of the reference coordinate system based on the first local coordinate system, the movement amount of the reference coordinate system based on the second local coordinate system, and the distance between the local coordinate systems.

By virtue of the structure of the present invention, it is possible to provide a method for controlling a robot apparatus having a plurality of movable legs and capable of expressing an observation object more precisely than related robot apparatuses.

The present invention is applied to a method for controlling a robot apparatus in which a dynamic change occurs between floor landing positions by an orientation change. The method comprises observing step for observing an outside environment via an outside observation sensor and outputting an observation result by a sensor coordinate system corresponding to the outside observation sensor, floor landing detecting step for detecting switching between the floor landing positions, and coordinate transforming step for transforming a coordinate of the observation result obtained by the observing step to a coordinate of a predetermined reference coordinate system. The observing step comprises successively outputting the coordinate of the observation result changing by the orientation change along with time information. The coordinate transforming step comprises detecting a movement amount between the floor landing positions changing by the orientation change from results of detection from orientation detecting sensors with reference to the time information of the observation result and transforming the coordinate of the observation result to the coordinate of the reference coordinate system by correction by the movement amount in order to switch the floor landing position used for the detection of the movement amount as a result of the detection of the switching between the floor landing positions by the floor landing detecting step, the orientation detecting sensors detecting the angles of joints involved in the orientation change among at least joints disposed from the outside observation sensor to the floor landing positions.

By virtue of the structure of the present invention, it is possible to provide a method for controlling a robot apparatus capable of expressing an observation object more precisely than related robot apparatuses.

The present invention is applied to a method for controlling a robot apparatus comprising a trunk and a plurality of movable legs connected to the trunk. The method comprises first movement amount calculating step for calculating a movement amount of a reference coordinate system disposed at the trunk on the basis of a first local coordinate system disposed at a first floor contact position where one of the movable legs contacts a floor, second movement amount calculating step for calculating a movement amount of the reference coordinate system on the basis of a second local coordinate system disposed at a second floor contact position where another one of the movable legs contacts the floor, and distance calculating step for calculating the distance between the first local coordinate system and the second local coordinate system. A movement amount of the reference coordinate system is successively calculated on the basis of the movement amount based on the first local coordinate system, the movement amount based on the second local coordinate system, and the distance between the local coordinate systems due to switching between the movable legs that contact the floor.

By virtue of the structure of the present invention, it is possible to provide a method for controlling a robot apparatus capable of expressing an observation object more precisely than related robot apparatuses.

BRIEF DESCRIPTION OF THE DRAWINGS

FIGS. 13(A) and 13(B) are schematic diagrams illustrating a different example of combination of recognition results from the example illustrated in FIG. 12.

FIG. 14 is a diagram illustrating coordinate transformation in a robot of a second embodiment of the present invention.

FIGS. 16(A) and 16(B) are schematic diagrams illustrating coordinate transformation related to sitting with bent legs.

BEST MODE FOR CARRYING OUT THE INVENTION

Hereunder, embodiments of the present invention will be described in detail with reference to the drawings as necessary.

(1) First Embodiment (1-1) Structure of the First Embodiment

Figure 4:
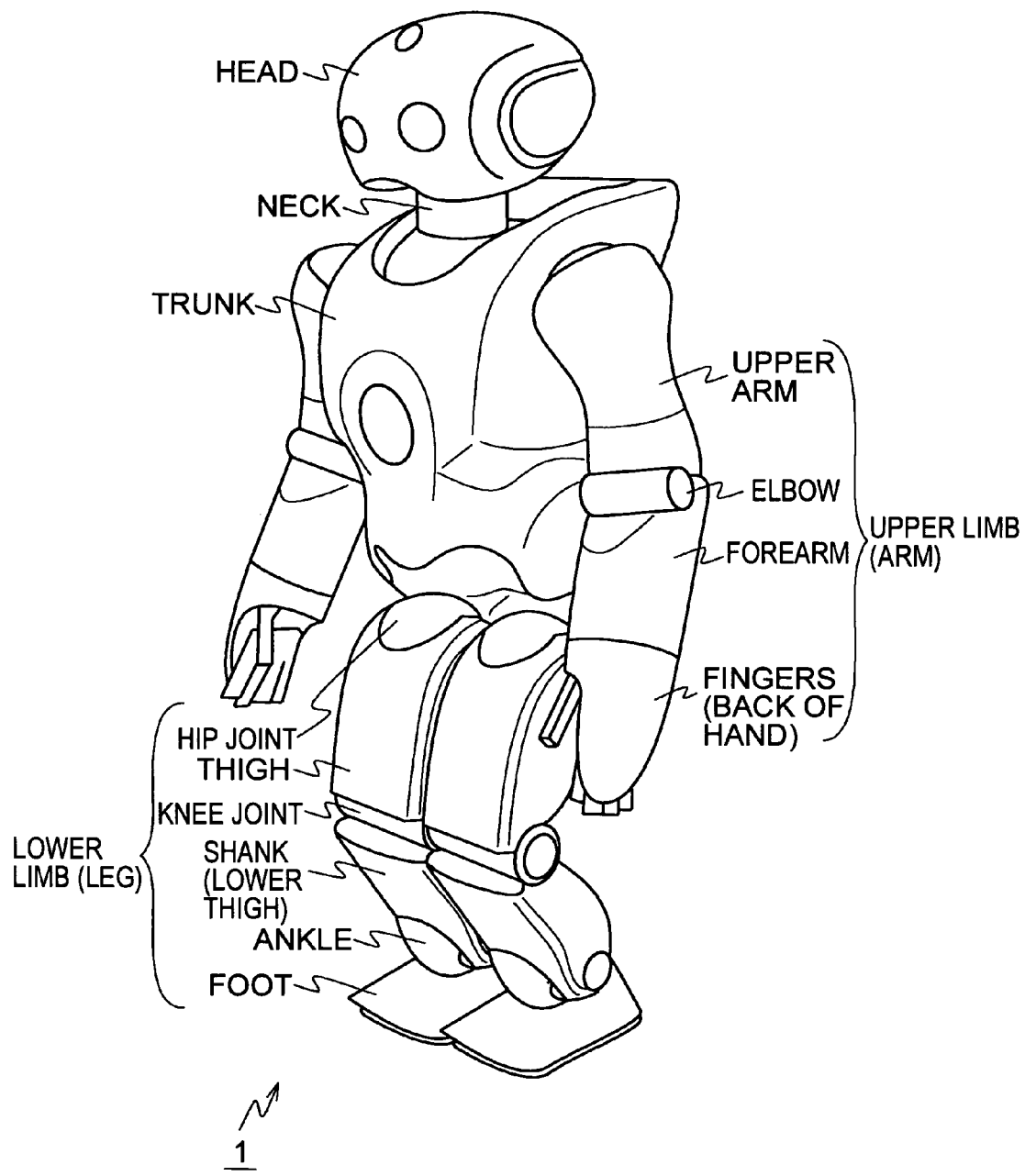
FIG. 4 is a perspective front view of a robot of a first embodiment of the present invention.
Figure 5:
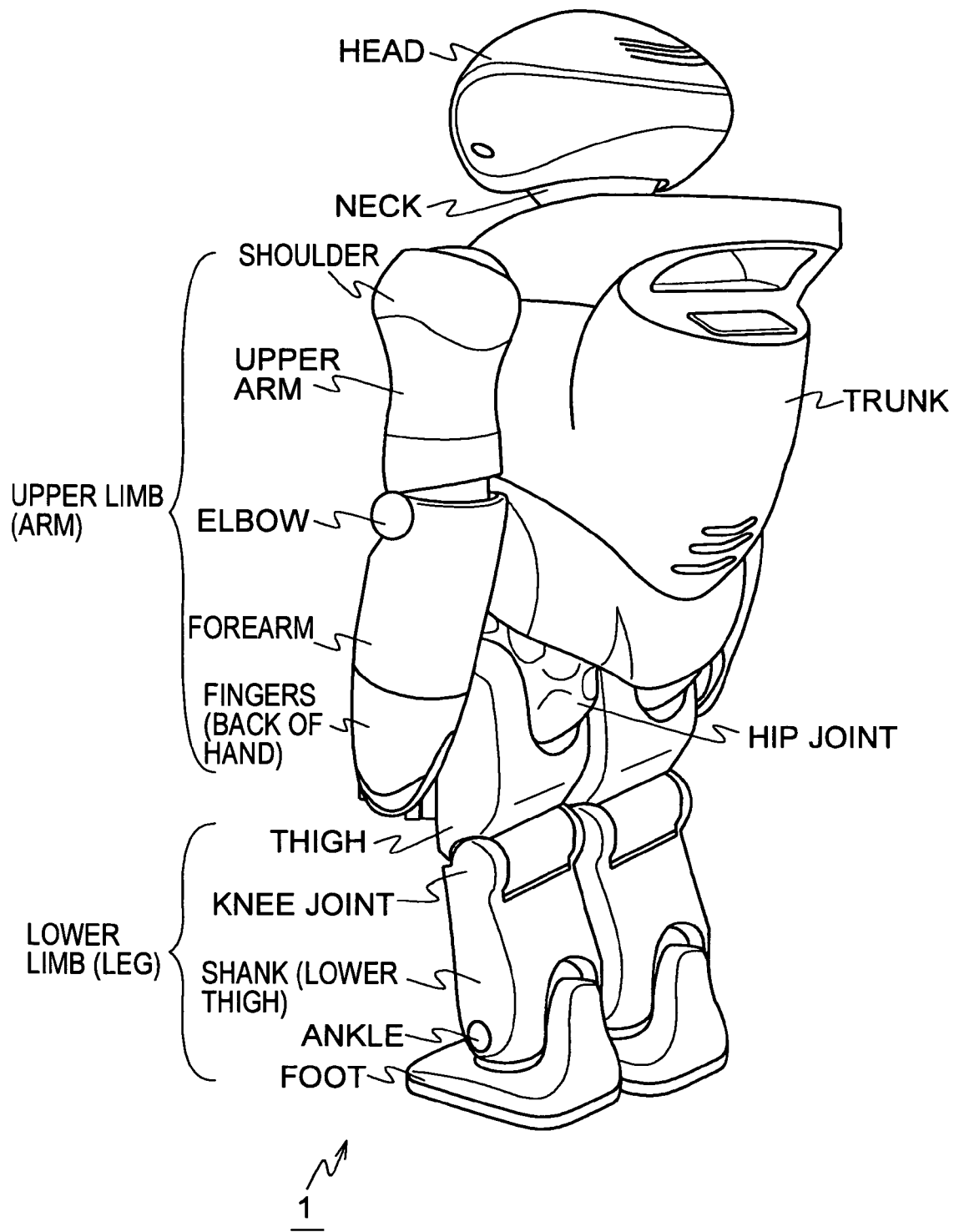
FIG. 5 is a perspective back view of the robot shown in FIG. 4.

FIGS. 4 and 5 are a perspective front view and a perspective back view of an erect legged mobile robot 1 of an embodiment of the present invention. The legged mobile robot 1 is what is called a humanoid type. It has a trunk to which a head, upper left and right limbs, and lower left and right limbs or left and right legs for movement with legs are attached. The overall movement is controlled by a controlling unit installed at the trunk.

The lower left and right limbs are connected to a substantially lowest end of the trunk, and each comprise a thigh, a knee joint, a shank, an ankle, and a foot in that order from the trunk. The upper left and right limbs are connected to substantially uppermost left and right ends of the trunk, and each comprise an upper arm, an elbow joint, and a forearm in that order from the trunk. The head is connected to a substantially uppermost end center of the trunk by a neck joint.

Figure 6:
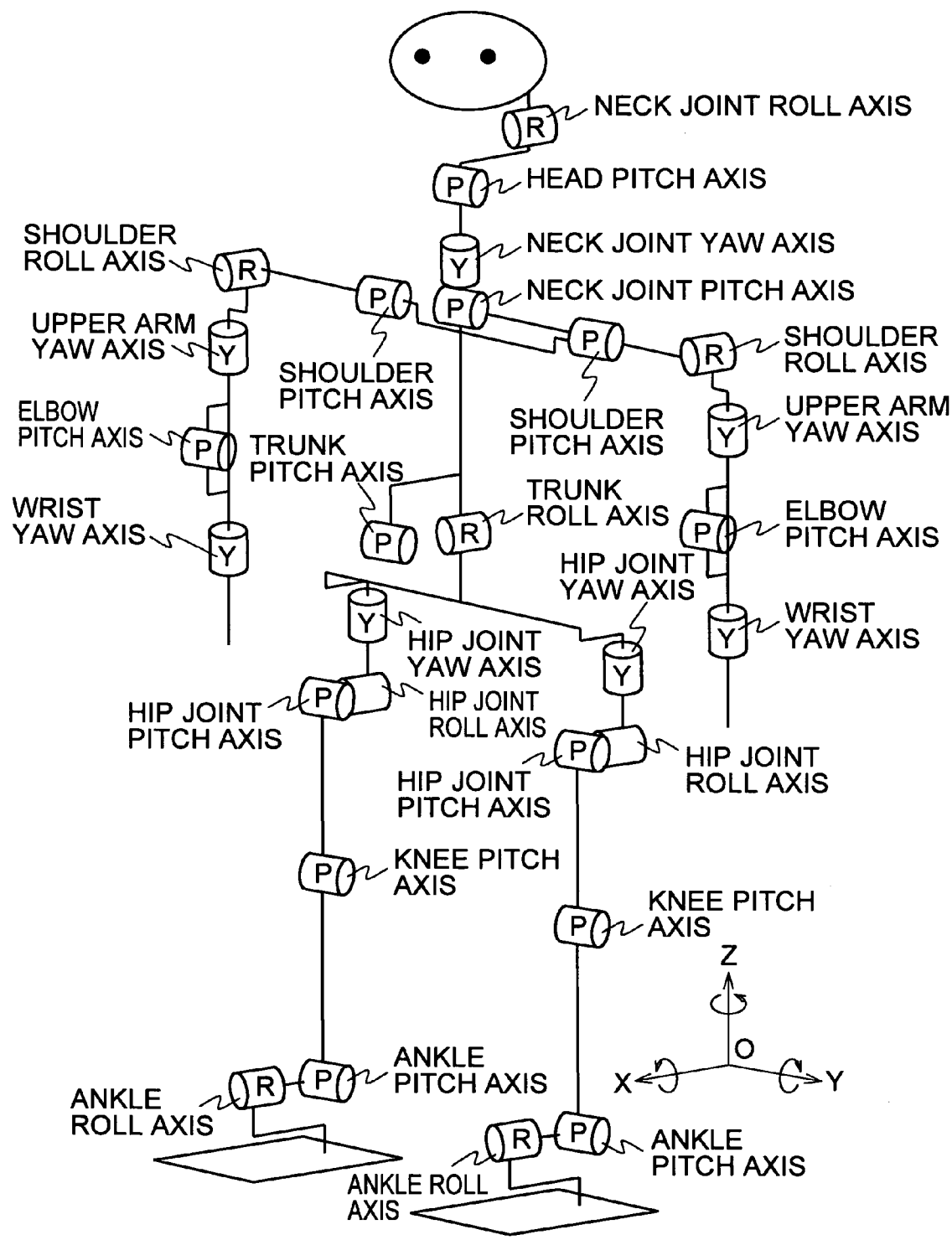
FIG. 6 is a schematic diagram illustrating the degrees of freedom at joints of the robot shown in FIG. 4.

In the legged mobile robot 1, actuators are provided at, for example, the joints of the upper and lower limbs so as to correspond to the degrees of freedom of the joints shown in FIG. 6. By controlling driving of these actuators by the controlling unit so that the whole body moves in cooperation, the robot apparatus walks with two legs. In general, biped walking is achieved by repeating a one leg supporting period in which the right leg is lifted and the left leg supports the robot apparatus, a both leg supporting period in which both legs are in contact with the floor, a one leg supporting period in which the left leg is lifted and the right leg supports the robot apparatus, and the both leg supporting period in which both legs are in contact with the floor.

In the legged mobile robot 1, angle sensors are provided at joints whose angles change as a result of biped walking among at least the joints between the head to which outside observation sensors (described later) are mounted and a floor landing position. The angle sensors are used as orientation detecting sensors for detecting the angles of the joints involved in changing the orientation. The amount of movement of each part changing due to the change in orientation can be determined by the controlling unit with reference to the floor landing position.

Weight placement sensors are provided at the lower left and right limbs as portions of floor landing detecting means for detecting switching between floor landing positions. Each weight placement sensor measures the weight placed on its associated right or left leg and changing due to walking. By this, it is possible to determine, for example, which leg is currently in contact with the floor on the basis of the results of measurements by the weight placement sensors. In this embodiment, although the weight placement sensors are disposed at portions of both soles that come into contact with the floor, they may be provided at the ankles, the knee joints, the hip joints, or any other parts whose weight placements change similarly to the soles.

In the legged mobile robot 1, a pair of imaging mechanisms used as outside observation sensors are disposed at the eyes of the head. By processing imaging results provided by the pair of imaging mechanisms by the controlling unit, it is possible to determine, for example, the coordinates of a user or an obstacle by what is called a stereo visual method.

In the legged mobile robot 1, a sound obtaining mechanism comprising a plurality of microphones similarly serving as an outside observation sensor is disposed at the head. By this, the controlling unit analyzes a sound signal obtained from the sound obtaining mechanism in order to detect a person's voice or to determine a voice arrival direction.

Figure 7:
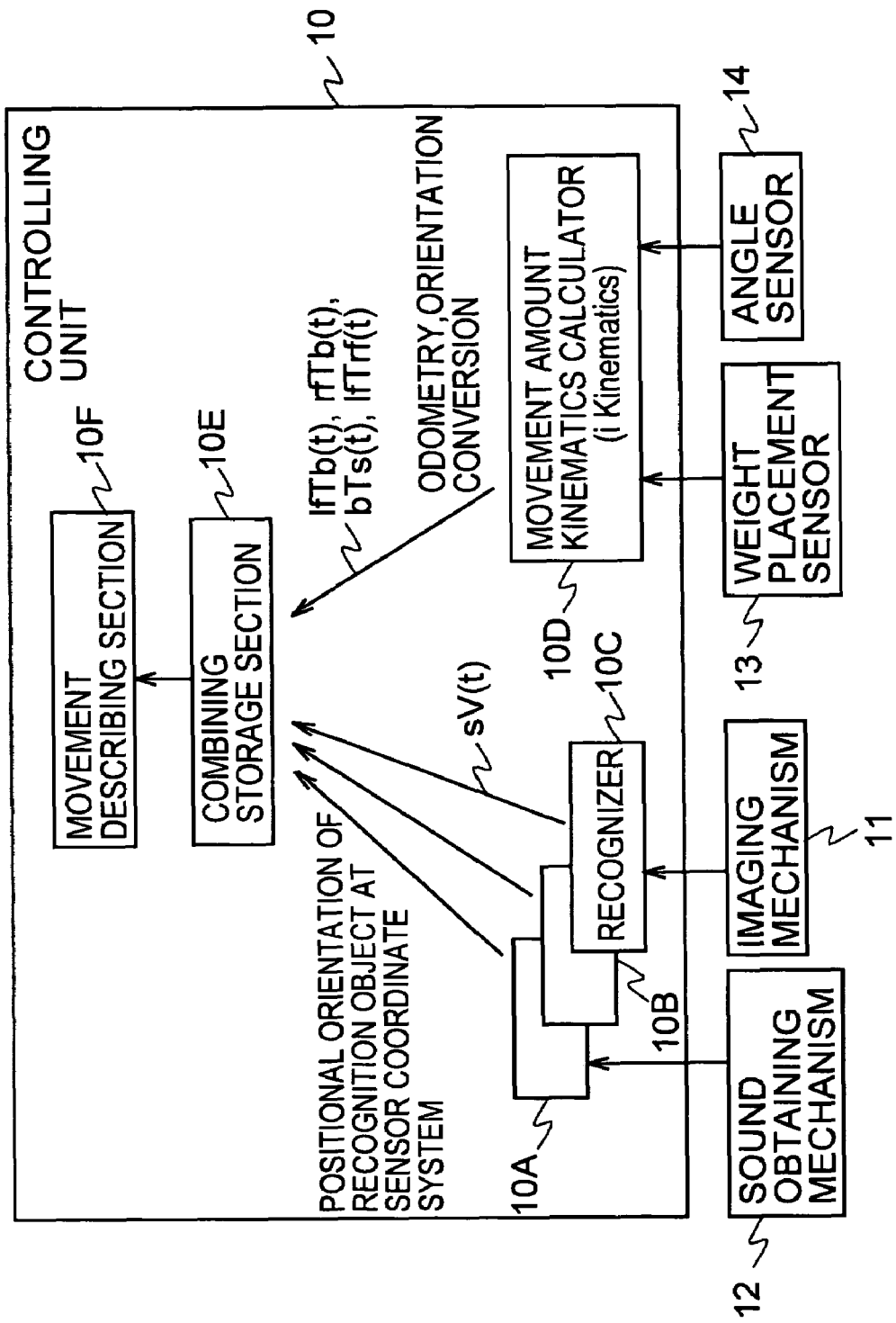
FIG. 7 is a functional block diagram of the structure of a portion of a controlling unit of the robot shown in FIG. 4.

FIG. 7 is a functional block diagram of the structure of a portion of the controlling unit for combining and controlling the movements of the parts. A controlling unit 10 comprises a computer for executing a predetermined processing program recorded in a memory. Various modules having predetermined functions that are achieved by executing the processing program are provided in order to control the overall movement.

Among the modules, recognizers 10A to 10C process imaging results and a sound signal, obtained, respectively, from the imaging mechanisms 11 and the sound obtaining mechanism 12, disposed as outside observation sensors at the head, in order to observe the surrounding of the robot and to output the observation results. Here, in the embodiment, for example, a recognizer for recognizing a ball from its shape, a recognizer for recognizing a ball from its color, a recognizer for recognizing the face of a person, and a recognizer for recognizing an obstacle are provided due to image recognitions of imaging results.

The recognizers 10A to 10C output observation results by sensor coordinate systems corresponding to the outside observation sensors. The recognizers 10A to 10C successively process outputs from the outside observation sensors, and output recognition results with time information obtained by a processing object. By this, these recognizers 10A to 10C serve as observing means for observing the outside environment via the outside observation sensors and outputting the observation results by the sensor coordinate systems corresponding to the outside observation sensors. In this embodiment, the coordinates of the observation results that change due to changes in orientation by biped walking are successively output together with the time information.

A movement amount kinematics calculator 10D detects an on-floor leg by determining weight placement detection results from weight placement sensors 13. Here, the on-floor leg refers to the leg on which the weight of the robot is placed. In the one leg supporting period, the on-floor leg corresponds to the leg that is in contact with the floor. In the both leg supporting period in which both legs are in contact with the floor, any on-floor leg that had been on the floor up to this time is used.

More specifically, the movement amount kinematics calculator 10D evaluates the difference between the weight placement values detected by the weight placement sensors 13 disposed at the left and right legs by a predetermined threshold value in order to define the foot on which more weight is placed to be the on-floor foot (or the weight placement foot) when the difference between the weight placement values of the two feet exceed the threshold value for a predetermined period of time. When the weight on the two feet are substantially equal, such as when the robot apparatus is standing erect, the difference does not exceed the threshold value, so that any on-floor foot continues to be in the previous state.

With an on-floor foot detected in this way serving as reference, the movement amount kinematics calculator 10D successively detects and outputs the movement amount of an origin coordinate (body reference point) serving as a robot center coordinate. The movement amount kinematics calculator 10D performs calculation on the detected movement amount by kinematics (geometric kinematics) in which the joint angles detected by angle sensors 14 serve as references. In this embodiment, the origin coordinate serving as the robot center coordinate is set at the waist.

The movement amount kinematics calculator 10D outputs the movement amount of the body reference point detected in this way by a homogeneous transformation matrix T in which the body reference point is expressed by a coordinate system having a reference position set at the sole of an on-floor. The homogeneous transformation matrix T is expressed as follows:

$$T = \begin{bmatrix} r_{11} & r_{12} & r_{13} & x \\ r_{21} & r_{22} & r_{23} & y \\ r_{31} & r_{32} & r_{33} & z \\ 0 & 0 & 0 & 1 \end{bmatrix} \quad (1)$$

Figure 8:
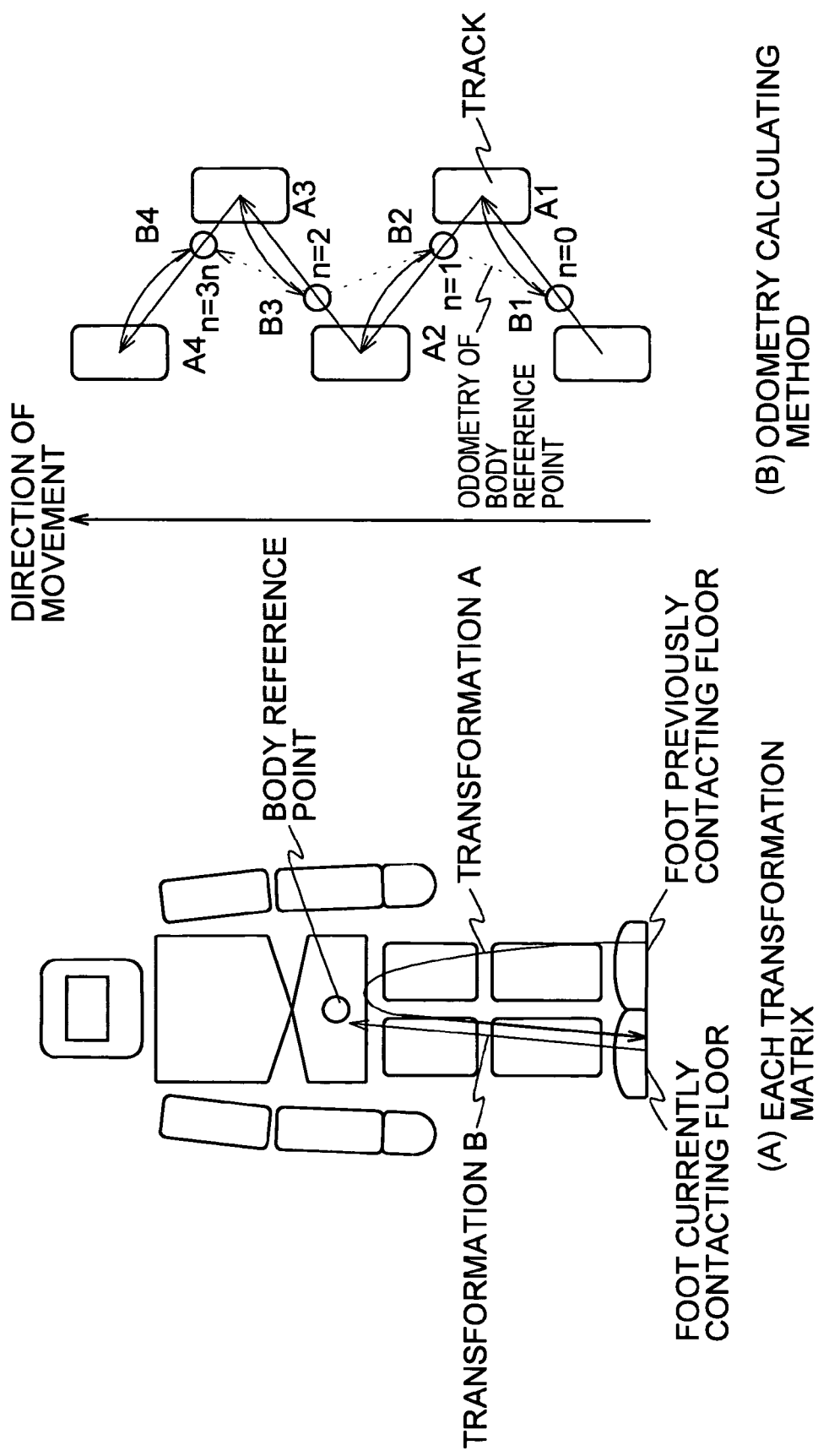
FIGS. 8(A) and 8(B) are schematic diagrams illustrating switching between on-floor legs.

By this, in the one leg supporting period in which the right leg is floating in the direction of the two legs as viewed from the front of the robot as shown in FIG. 8(A), the movement amount kinematics calculator 10D sets the left leg as the on-floor leg, and calculates the movement amount using the joint angles from the left leg to the next on-floor leg (transformation A). When the floating foot comes into contact with the floor and weight equal to or greater than a predetermined value is placed on the foot, causing the on-floor leg to be changed, transformation to the robot center coordinate serving as a reference coordinate is switched to that based on the next on-floor foot (transformation B). The movement amount provided by the next on-floor foot in this way is separately provided each time the foot lands on the floor as shown by subscripts added to the transformations A and B shown in FIG. 8(B). However, the change in orientation when the foot is floating between these times is provided by the transformation B. Therefore, changes occur successively at the body reference point by multiplying the transformations A and B.

Figure 9:
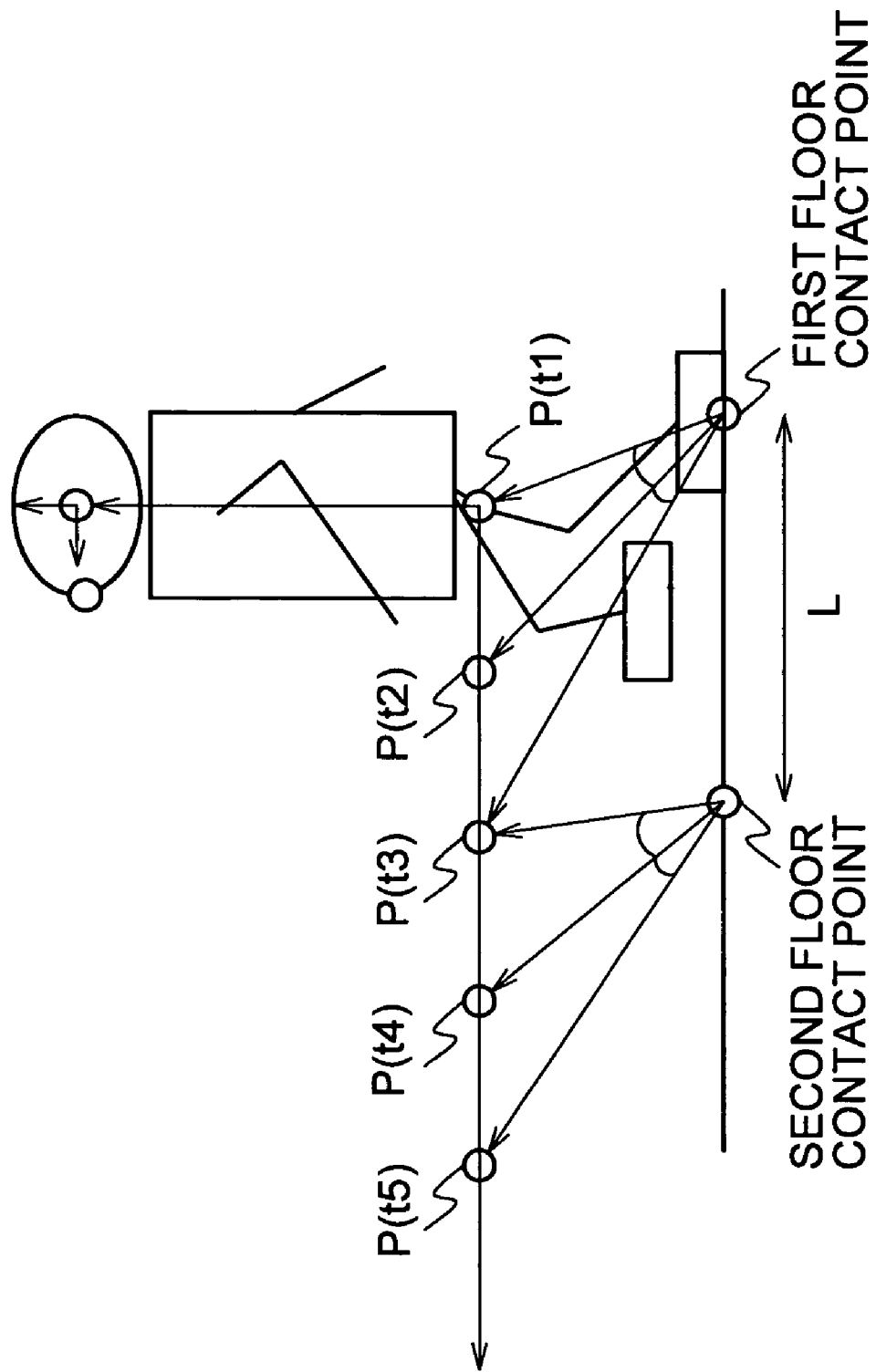
FIG. 9 is a schematic diagram illustrating the amount of movement of a reference coordinate system.

More specifically, viewing these movements from the side, as shown in FIG. 9, by using kinematics in which the joint angles detected by the angle sensor 14 disposed at the on-floor foot is used as a reference, movement amounts of body reference points P(t1), P(t2), and P(t3) are successively calculated by a coordinate system (what is called a local coordinate system with respect to the coordinate system of the body reference) based on a first floor contact point serving as a reference position set at the sole of the on-floor foot. Similarly, movement amounts of body reference points P(t3), P(t4), and P(t5) are successively calculated by a local coordinate system based on a second floor contact point when the on-floor foot is switched. In addition, by reconverting the movement amounts of the body reference points P(t1), P(t2) and P(t3) with reference to the second floor contact point, the movement amounts of the body references P(t1) to P(t3) to P(t5), detected before and after the switching between the on-floor feet, are determined so that they change continuously. By this, in the embodiment, an observation object can be precisely expressed by the outside observation results using such body references as references.

From the above, in this embodiment, the trunk, and the lower limbs, the upper limbs, the head, etc., connected to the trunk, comprise a main body and a plurality of movable portions connected to the main body, respectively, and the body reference coordinate system disposed at the trunk is the robot reference coordinate system. A first local coordinate system and a second local coordinate system, disposed at the first floor contact position and the second floor contact position where the two lower limbs contact the floor, are disposed at the two lower limbs. The angle sensors 14 and the movement amount kinematics calculator 10D comprise first movement amount calculating means for calculating the movement amount of the reference coordinate system on the basis of the first local coordinate system, second movement amount calculating means for calculating the movement amount of the reference coordinate system on the basis of the second local coordinate system, and means for calculating the distance between the first local coordinate system and the second local coordinate system. The angle sensors 14 and the movement amount kinematics calculator 10D are used to calculate a movement amount of the reference coordinate system on the basis of the movement amount of the reference coordinate system based on the first local coordinate system, the movement amount of the reference coordinate system based on the second local coordinate system, and the distance between the local coordinate systems.

In addition to coordinate transformation from such floor contact points to the body reference point, the movement amount kinematics calculator 10D calculates coordinate transformation from the body reference point to the outside observation sensor mounting positions similarly from the joint angles and returns it. The movement amounts between the floor landing positions that change in this manner are calculated and output due to the switching between the floor landing feet. Time information is set in these pieces of information (hereunder referred to as orientation information as required) and output.

A combining storage section 10E combines and stores recognition results from the recognizers 10A to 10C and outputs the stored recognition results by a request from a movement describing section 10F. Here, the movement describing section 10F is a module for moving the robot so as to, for example, avoid an obstacle or follow a favorite ball by providing a planned target walking path of the robot, and by issuing a command to a module (not shown) while correcting the planned path by the combination result from the combining storage section 10E.

The combining storage section 10E combines observation results by the robot center coordinate in order to facilitate the processing at the movement describing section 10F. In other words, if the recognition results are expressed in terms of the robot center coordinate, it is possible to describe movement, such as swinging to the right if the ball is at the right as viewed from the robot. By this, it is possible to simplify the description compared to the case in which the ball is described as being at coordinates (x1, y1) in a world coordinate system.

More specifically, with reference to the time information of the recognition results, the combining storage section 10E transforms the recognition results to those expressed in terms of a self center coordinate system that serves as a predetermined reference coordinate system and that has the sole of an on-floor foot as a reference by calculation using the following formula. At this time, coordinate transformation is performed by correction by the movement amount with respect to the floor landing position that changes with changes in orientation by biped walking. T denotes the homogeneous transformation matrix representing the above-described coordinate transformation and expressed by Formula (1), the left subscript of T denotes the original coordinate system, and the right subscript of T denotes the coordinate system after transformation. lf denotes the left sole coordinate system, and rf denotes the right sole coordinate system. b denotes the body reference coordinate system serving as the robot center, s denotes a sensor coordinate system, and the letter in parentheses ( ) denotes time. Lower case letters vectorially denote the position of a recognition object. By this, Formula (2) gives the position of an object in terms of the left sole coordinate system by multiplying the position of the object based on the sensor coordinate system when transformation is made to the sensor coordinate system from the reference coordinate system after transformation to the reference coordinate system from the left sole at a time t. In Formula (2), $_{lf}T_b(t)$ and $_bT(t)$ represent orientation information obtained by the movement amount kinematics calculator 10D, and $_sv(t)$ represents a recognition result based on the sensor coordinate system and obtained from each of the recognizers 10A to 10C.

$$_{lf}T_b(t) \times _bT(t) \times _sv(t) = _{lf}v(t) \qquad (2)$$

The combining storage section 10E temporarily records and holds the outputs from the movement amount kinematics calculator 10D and the recognizers 10A to 10C in a memory (called queue), searches the queue when data corresponding to the time information of the recognition results is provided (in this case when the recognition results are obtained because the most time is required for the recognition), and performs a calculation using Formula (2). Such operations are executed by the movement amount of the corresponding time with reference to the time information set in the recognition results.

Figure 10:
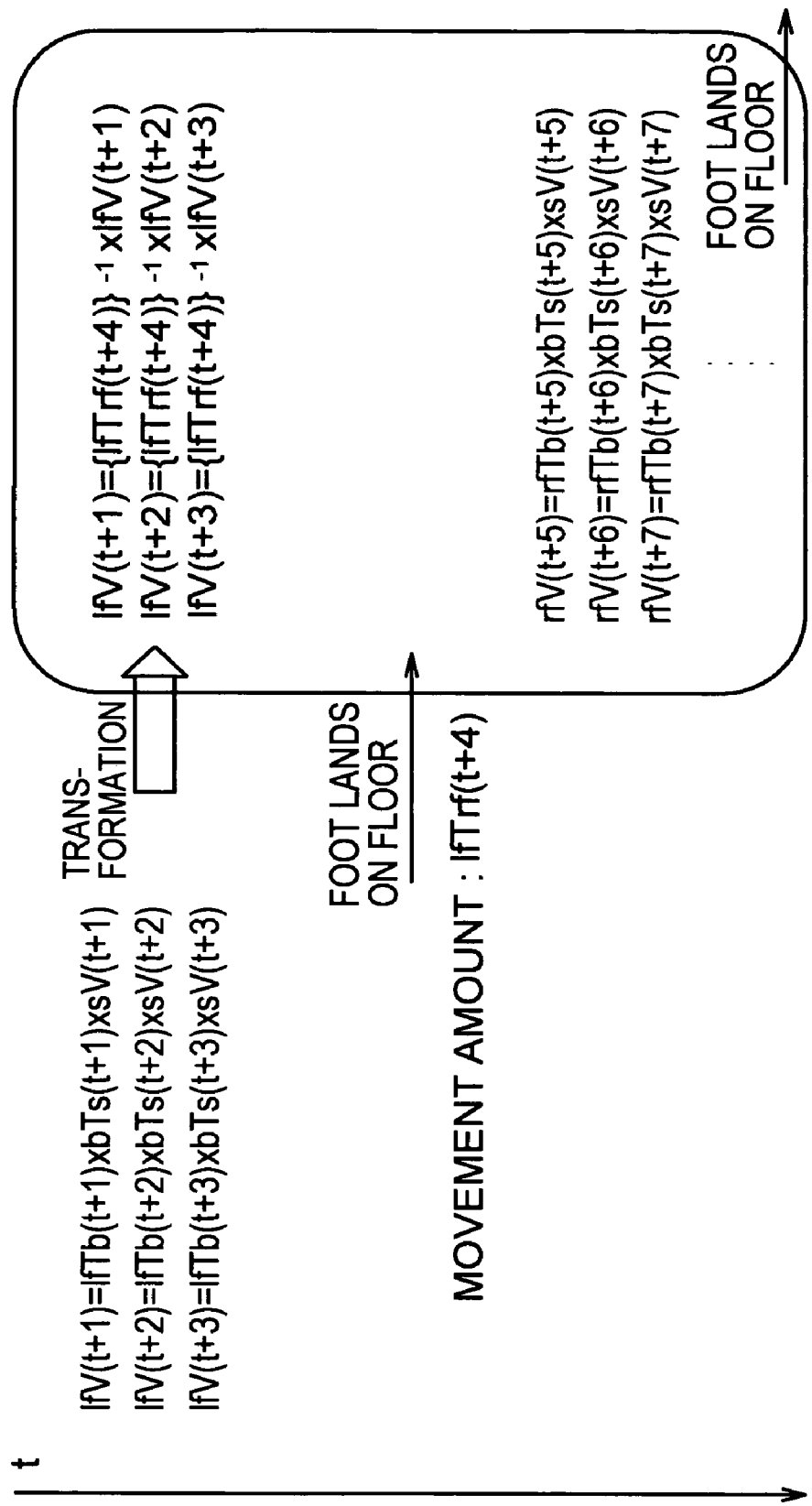
FIG. 10 is a diagram illustrating coordinate transformation at a combining storage unit.

More specifically, as shown in FIG. 10, recognition results $_sv(t+1)$, $_sv(t+2)$, and $_sv(t+3)$ obtained at times t+1, t+2, and t+3 are multiplied to orientation information $_{lf}T_b(t+1)$, $_{lf}T_b(t+2)$, $_{lf}T_b(t+3)$, $_bT(t+1)$, $_bT(t+2)$, and $_bT(t+3)$ of the corresponding times in order to successively transform the recognition results to those expressed in terms of the coordinate system based on the left leg. By this, the combining storage section 10E combines the recognition results and records and holds the combined recognition result provided by the coordinate transformation for a predetermined period of time.

When the right leg lands on the floor at a time t+4, the movement amount kinematics calculator 10D provides a movement amount $_{lf}T_{rf}(t+4)$. Orientation information $_{rf}T_b(t)$ in which the right leg is used as a reference is successively input in place of the orientation information $_{lf}T_b(t)$ in which the left leg is the reference. Therefore, from the time t+4 onwards, the combining storage section 10E similarly performs a calculation based on Formula (2) using the orientation information $_{rf}T_b(t)$ in which the right leg is used as the reference in order to successively perform a recognition transformation so as to express in terms of a coordinate based on the right leg. By this, the combining storage section 10E can process the successively obtained recognition results without controlling the switching between the on-floor feet in any way.

The combining storage section 10E transforms the past recognition results on the basis of the time of the recorded and held movement amount by notification of the movement amount $_{lf}T_{rf}(t+4)$ by the movement amount kinematics calculator 10D so that the recognition results produced by switching the reference or the on-floor foot correspond to the recorded and held recognition results. Here, the coordinate transformation is executed by multiplying an inverse matrix $({}^{lf}T_{rf}(t+4))^{-1}$ of the movement amount $_{lf}T_{rf}(t+4)$ provided by the movement amount kinematics calculator 10D to the recorded and held recognition results $_{lf}v(t+1)$, $_{lf}v(t+2)$, and $_{lf}v(t+3)$.

Accordingly, the combining storage section 10E can easily combine the recorded and held recognition results and process them. More specifically, it is possible to examine the relationship between the recognition results of different times of difference sensors and filtering of past observation results.

Figure 11:
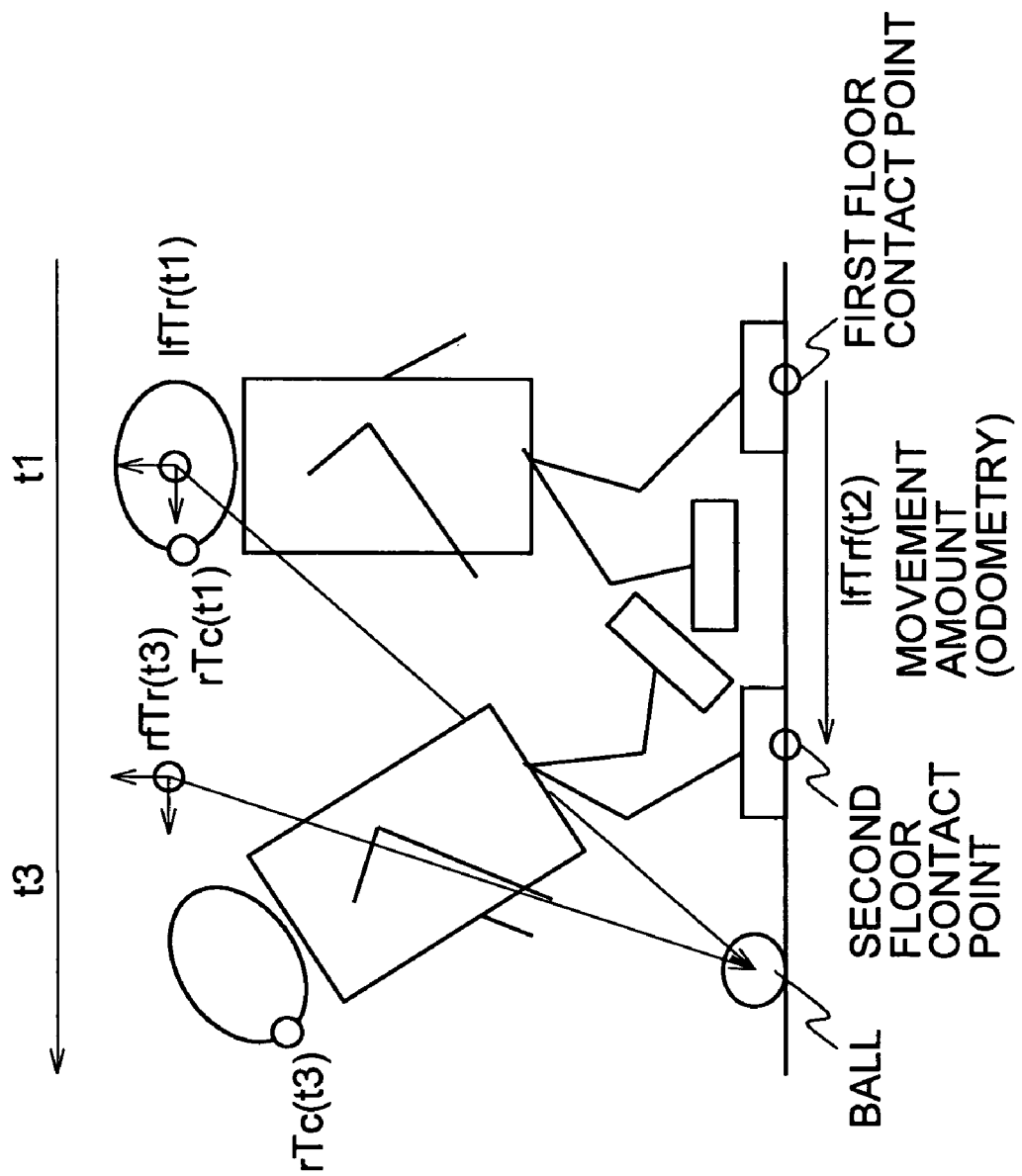
FIG. 11 is a schematic diagram illustrating coordinate transformation related to a ball observation result.

A more specific example in which the recognition results are those of a ball will be described. As shown in FIG. 11, ball observation results $_cT_{ball}(t1)$ and $_cT_{ball}(t3)$ based on a sensor coordinate system at times t1 and t3 are detected. When the left leg is the on-floor leg at the time t1, the right leg is the on-floor leg at the time t2, and the right leg is the on-floor leg at a time t3, the ball observation result $_cT_{ball}(t1)$ based on the sensor coordinate system at the time t1 and orientation information $_rT_c(t1)$ based on the origin of the sensor coordinate system at a reference coordinate system are used in order to express a ball position $_rT_{ball}(t1)$ at the time t1 by the equation $_rT_{ball}(t1) = _rT_c(t1) \cdot _cT_{ball}(t1)$. In this example shown in FIG. 11, in order to simply show the relationship with the sensor coordinate system, the origin of the reference coordinate system is disposed above the waist and behind the origin of the sensor coordinate system. In this case, the reference coordinate system at the time t1 is represented by $_{lf}T_r(t1)$ based on the local coordinate system of the left leg.

When the right leg lands on the floor at the time t2 from this state, by the distance between local coordinate systems or the movement amount to a floor contact point of the right leg from a floor contact point of the left leg at the time t2, that is, by the local coordinate system based on the left leg, the second floor contact point can be represented by $_{lf}T_{rf}(t2)$. By this, the reference coordinate $_{lf}T_r(t1)$ at the time t1 is multiplied to an inverse matrix $(_{lf}T_{rf}(t2))^{-1}$ of the movement amount $_{lf}T_{rf}(t2)$ and can be expressed with reference to the second floor contact point by the equation $(_{lf}T_{rf}(t2))^{-1} \cdot _{lf}T_r(t1)$. Similarly, the ball position $_rT_{ball}(t1)$ at the time t1 is multiplied to the inverse matrix $(_{lf}T_{rf}(t2))^{-1}$, and can be expressed with reference to the second floor contact point by the equation $(_{lf}T_{rf}(t2))^{-1} \cdot _rT_{ball}(t1)$.

In contrast, a ball position $_rT_{ball}(t3)$ detected at the time T3 is expressed by the equation $_rT_{ball}(t3) = _rT_c(t3) \cdot _cT_{ball}(t3)$ with reference to the second floor contact point. Similarly the reference coordinate is expressed by $_{rf}T_r(t3)$. Therefore, the observation results at the times t1 to t3 are represented with reference to the right leg (that is, the second floor contact point) at the reference coordinate, so that the successively obtained recognition results can be processed.

Figure 12:
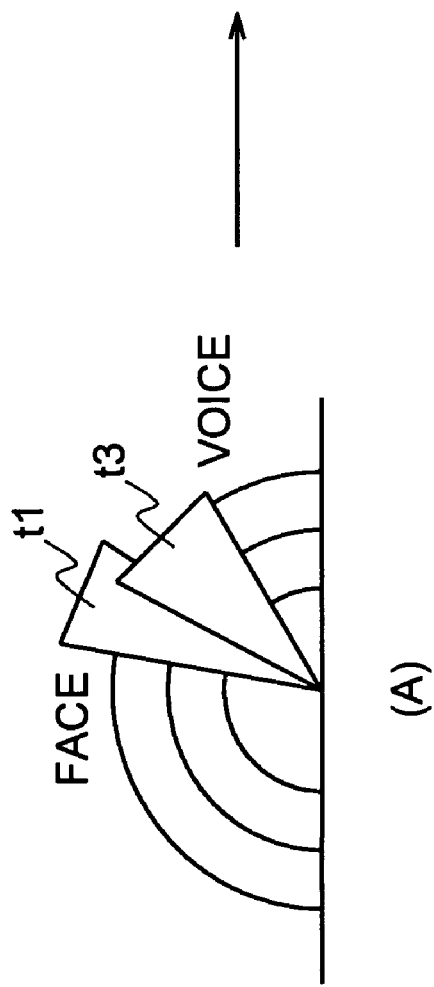
FIGS. 12(A) and 12(B) are schematic diagrams illustrating an example of combination of recognition results at the combining storage unit.

In contrast, FIG. 12(A) is a schematic diagram illustrating the combination of a recognition result (Face) from a face recognizer at a time t1 and a recognition result (voice) from a sound recognizer at a time t3 by the combining storage section 10E. When the combining storage section 10E combines these recognition results and determines that the coordinates of these two recognition results can be corrected and superimposed upon each other by the movement amount when the robot moves due to a change in its orientation as shown in FIG. 12(B), a determination is made that the recognition results from the face recognizer and the voice recognizer at different times are those of the same person, so that the direction in which the person exists is properly determined from the self center coordinate system.

As shown in FIG. 13(A), when it can be determined that a pink object is moving from recognition results from a color recognizer at times t1, t2, and t3, and that a round object's coordinate included in a recognition result from a ball recognizer at the time t1 among these times substantially matches the coordinate of the pink object, the combining storage section 10E determines that the ball is pink, and properly combines and perceives the recognition results by the self center coordinate system.

Accordingly, in the legged mobile robot 1, the imaging mechanisms and the sound obtaining mechanism are used as outside observation sensors. The recognizers 10A to 10C serve as observing means for observing the outside environment via these outside observation sensors, and outputting the observation results by the sensor coordinate system of each of the outside observation sensors. The angle sensors disposed at the respective joints serve as orientation detecting sensors for detecting the angles of joints involved in changing the orientation among joints disposed from the outside observation sensors to a floor landing position. The weight placement sensors disposed at the left and right legs comprise, together with the movement amount kinematics calculator 10D, floor landing detecting means for detecting switching of the floor landing position. The combining storage section 10E, together with the movement amount kinematics calculator 10D, comprise coordinate transforming means for transforming the coordinates of the observation results from the observing means to coordinates of a predetermined reference coordinate system. In this embodiment, with reference to the time information of the observation results, the movement amount with respect to the floor landing position that changes with a change in orientation is detected from the detection results from the orientation detecting sensors. The coordinate of the observation result is corrected by the movement amount and transformed to that of the predetermined reference coordinate system. The floor landing detecting means detect the switching of the floor landing position in order to switch the floor landing position used for the detection of the movement amount.

(1-2) Operation of First Embodiment

In the legged mobile robot having the above-described structure, the actuators disposed at the respective portions are driven by the movement describing section 10F at the controlling unit disposed at the trunk in order to cause the robot to walk with two feet. In the legged mobile robot 1, the right and left legs alternately land on the floor by changes in the orientation caused by the feet joints used in biped walking. Therefore, by changes in the orientation, the floor landing position changes dynamically, so that the robot moves in accordance with the controlling operation by the movement describing section 10F.

In such movement of the legged mobile robot 1, the foot on which weight is placed is detected at the movement amount kinematics calculator 10D via the weight placement sensors disposed at the feet. With reference to the on-floor foot, which is the weight placement leg, detected in this manner, the movement amount is detected by kinematics in which the joint angles detected by the angle sensors disposed at the joints serve as references. By such a movement amount, a homogeneous transformation matrix of the body reference point with respect to the floor landing position is generated, and the orientation information based on the homogeneous transformation matrix is output to the combining storage section 10E.

The recognizers 10A to 10C process the imaging results and sound obtaining result from the outside recognition sensors disposed at the head. The recognition results in which the coordinate system of each of these outside recognition sensors serves as a references are output, together with the time information, to the combining storage section 10E.

Based on the angle sensors at the joints disposed from the body reference point to portions where the outside recognition sensors are disposed, the movement amount kinematics calculator 10D generates a homogeneous transformation matrix for transforming the recognition results based on the sensor coordinate system to the body reference point coordinate system. The orientation information based on the homogeneous transformation matrix is, together with the time information, output to the combining storage section 10E.

In the legged mobile robot 1, the orientation information based on the homogeneous transformation matrix and expressing the body reference point with reference to the detected floor landing position, the orientation information based on the homogeneous transformation matrix and expressing the sensor coordinate system with reference to the body reference point, and the recognition results based on the sensor coordinate are processed with reference to time information of the recognition results in order to express the recognition results with reference to the floor landing position.

The reference coordinate system based on the body reference serving as such processing reference is transformed by switching the floor contact point and is expressed by successive movement amounts.

Figure 1:
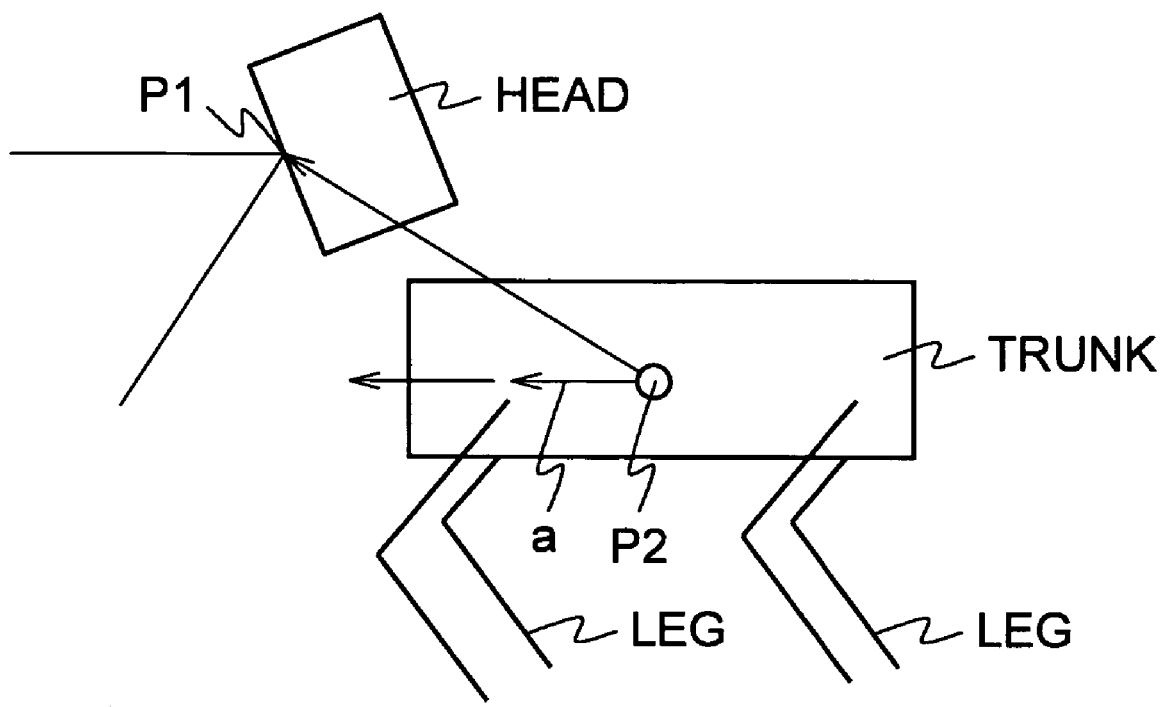
FIG. 1 is a schematic diagram illustrating processing of a recognition result in a related quadrupedal walking robot.
Figure 2:
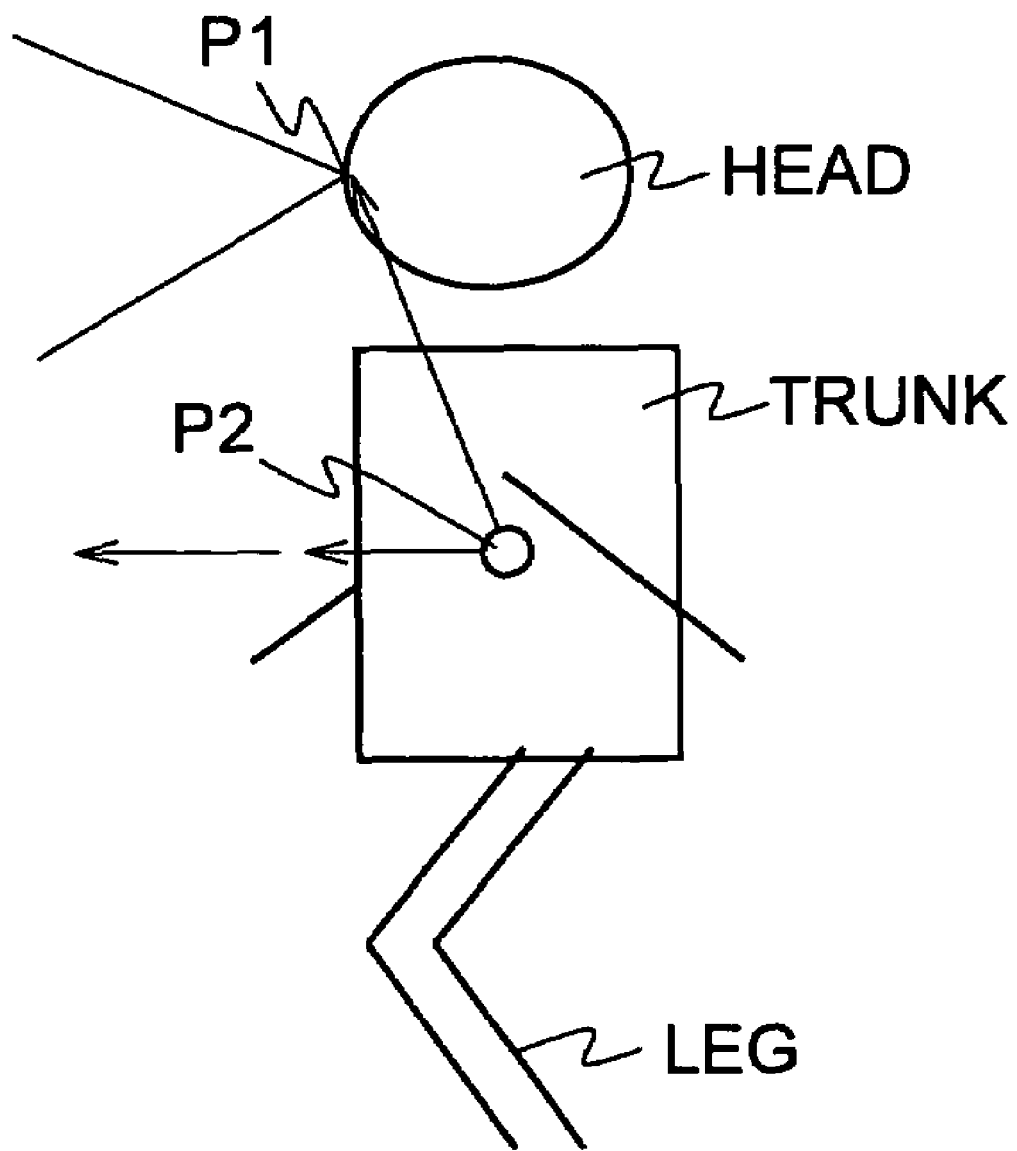
FIG. 2 is a schematic diagram illustrating processing of a recognition result in a related biped walking robot.
Figure 3:
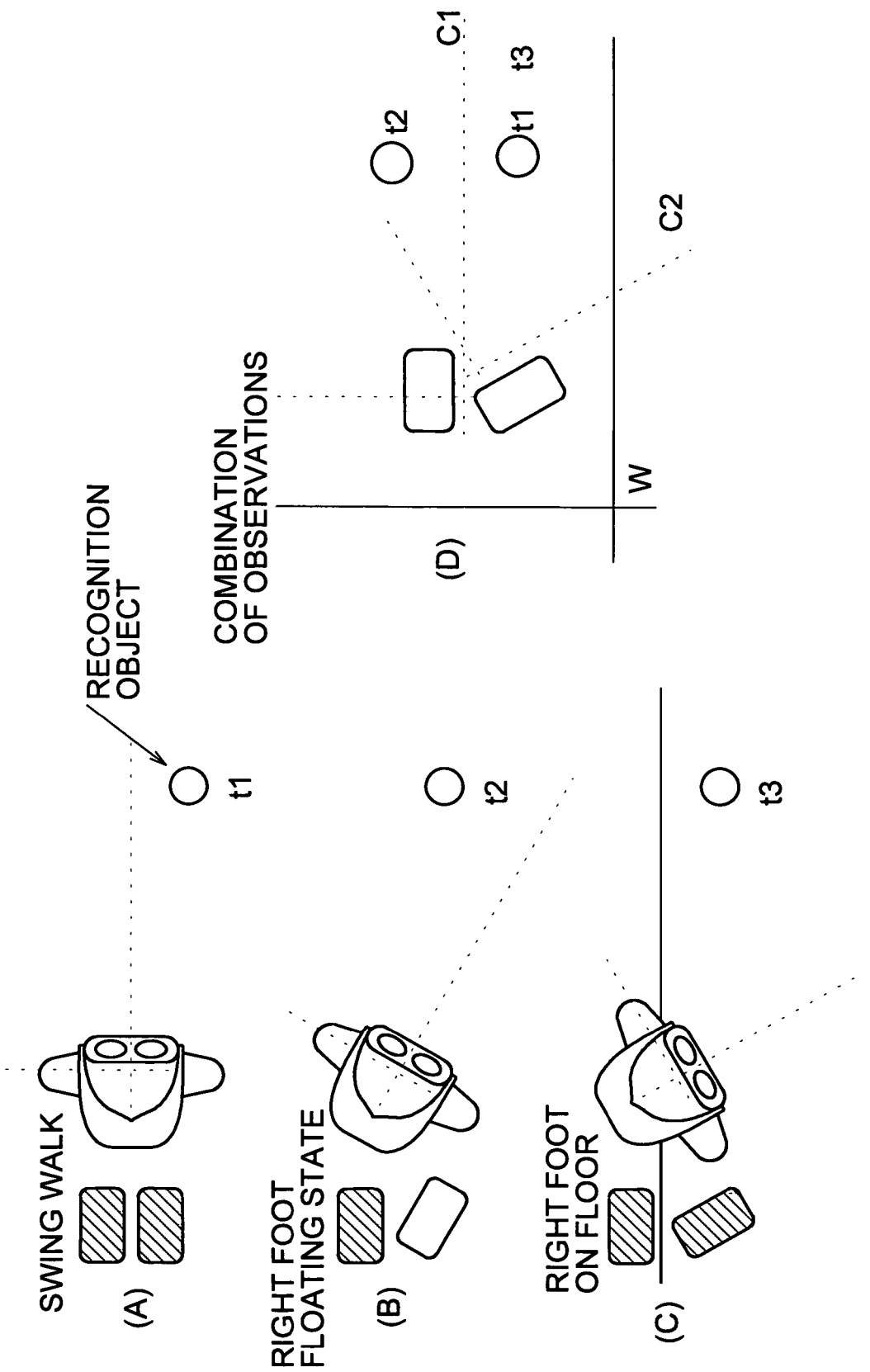
FIGS. 3(A), 3(B), 3(C), and 3(D) are schematic diagrams illustrating processing of recognition results during swinging.

Therefore, in the robot, even if there is a difference between the command issue time and the actual movement time or an error in the pace in the observation results expressed in terms of the robot center coordinate system disposed at the trunk, it is possible to accurately express the observation results detected by the sensors. For example, a recognition result obtained during swinging like the recognition result at the time t2 shown in FIG. 3 can be compared with the previous and following recognition results by correcting the coordinate transformation of the observation results based on the sensor movements. Therefore, it is possible to effectively eliminate a situation in which the recognition result is undefined. Consequently, the legged mobile robot 1 makes it possible to precisely express the recognition results with respect to an environment that changes by changes in orientation, and to easily combine the recognition results of different times. As described below, the movement describing section 10F serving as a module for controlling the floor contact points and orientation and the combining storage section 10E serving as a combining module can be formed as clearly separate components. Therefore, it is easy to describe the movement by the movement describing section 10F.

In the legged mobile robot 1, such coordinate transformation based on the recognition results is processed and executed by corresponding orientation information by time information set in the recognition results. The recognition results are recorded and held, and combined by the combining storage section 10E.

In the legged mobile robot 1, the movement amount kinematics calculator 10D evaluates the difference between the detection results from the weight placement sensors at the left and right legs by a predetermined threshold value. In this case, by determining the switching of the on-floor foot as a result of comparing the predetermined threshold value and the difference, erroneous detection of the weight placement leg or legs during, for example, the period in which the robot is supported by both legs is effectively prevented.

In the legged mobile robot 1, when the switching between the on-floor legs is detected, the reference of the orientation information having the trunk as a reference is switched, so that orientation information having the next on-floor leg as a reference is subsequently and successively output. By the switching between the on-floor legs, the movement amount resulting from the switching between the on-floor legs is detected, and is output to the combining storage section 10E. As a result, the combining storage section 10E performs coordinate transformation of the recognition results in the same way as it has been up to this time with reference to the orientation information expressing the body reference point with reference to the floor landing position, the orientation information expressing the sensor coordinate system with reference to the body reference point, the time information, and the recognition results based on the sensor coordinate in order to express the recognition results with reference to the floor landing position. Accordingly, the successively obtained recognition results can be processed without controlling the switching between the on-floor feet in any way.

Recognition results that are recorded as a result of coordinate transformation prior to switching between the on-floor legs are multiplied to an inverse matrix of the homogeneous transformation matrix indicating the movement amount resulting from the switching between the on-floor legs in order to perform coordinate transformation, so that the recognition results are expressed by a coordinate system in which the next on-floor leg serves as a reference and are recorded. Therefore, in the legged mobile robot 1, it is possible to easily and reliably combine a plurality of recognition results of different times in addition to a plurality of recognition results of the same time, so that, for example, a suitable movement can be realized accordingly.

In other words, in the legged mobile robot 1, the recognition results recorded in the combining storage section 10E in this way are combined, so that, for example, a favorite ball or an obstacle is expressed with reference to a floor landing position. With reference to these recognition results, the robot moves so as to, for example, follow the ball or to avoid the obstacle.

(1-3) Advantages of the First Embodiment

According to the above-described structure, it is possible to precisely express an observation object by expressing the movement amount of a reference coordinate system as a result of coordinate transformation due to switching between floor contact points.

In other words, it is possible to precisely express an observation object by correcting a coordinate of a measured value of each sensor on the basis of the movement amount of the reference coordinate system.

It is also possible to simply and reliably process the observation results provided before and after contacting of a foot with the floor by coordinate transformation of a recorded and held correction result in response to the switching between floor contact points. Therefore, it is again possible to more precisely express an observation object.

It is possible to precisely express an observation object by calculating the movement amount between a portion of the robot apparatus that had been in contact with a floor up to now and a next portion of the robot apparatus in contact with the floor using kinematics and by switching transformation to a coordinate system serving as an observation reference as a result of the switching between the floor contact portions.

Such a dynamic change between the floor landing positions due to a change in orientation corresponds to a change between the floor landing positions of the left and right legs used in biped walking. The orientation detecting sensors are angle sensors disposed at the joints of the left and right legs. The floor landing detecting means are weight placement sensors for detecting the weights placed on the left and right legs and evaluating means for evaluating the difference between the weight placement values detected by the weight placement sensors by a predetermined threshold value. Therefore, it is possible to effectively eliminate erroneous detection of the weight placement leg or legs during, for example, the period in which the robot is supported by both legs.

By recording and holding the coordinate transformation result and detecting the switching of the floor landing position by the floor landing means, the recorded and held coordinate transformation result is transformed in accordance with the switching of the floor landing position. By this, it is possible to make consistent the recognition results obtained by successive coordinate transformation and past recorded and held recognition results. Therefore, it is possible to easily combine the recognition results.

It is possible to provide precise autonomous movement by combining recorded and held coordinate transformation results in this way and reflecting this in the movement.

It is possible to easily describe the movement because the reference coordinate related to such a coordinate transformation is the self center coordinate having the soles of the floor landing feet as references.

(2) Second Embodiment

In this embodiment, the reference regarding the coordinate transformation of the aforementioned recognition results is set to a world coordinate. The structure of this embodiment is the same as that of the first embodiment except that the processing regarding this reference coordinate differs. Hereunder, the structure of the second embodiment will be described with reference to the structure of the first embodiment as required.

Here, as shown in FIG. 14, a combining storage section determines an initial value $_wT_{lf}(t)$ as orientation information of an on-floor leg in the world coordinate system. In this legged mobile robot 1, a left leg regarding this initial value $_wT_{lf}(t)$ is set as the on-floor foot and the robot starts to walk. Coordinate transformation is performed on recognition results to the world coordinate system by the orientation information having the left leg as a reference and output from a movement amount kinematics calculator 10D. In this case, the recognition results are expressed in terms of the world coordinate system instead of a coordinate system using the on-floor leg as a reference by multiplying a transformation matrix regarding the initial value $_wT_{lf}(t)$ to the computed processing results in FIG. 10.

Due to switching of the on-floor leg, the initial value $_wT_{lf}(t)$ regarding the reference on-floor foot is updated by the movement amount output from the movement amount kinematics calculator 10D in order to generate a transformation matrix $_wT_{rf}(t)$ related to the right leg. Subsequent to this, recognition results based on a sensor coordinate system are processed by the transformation matrix $_wT_{rf}(t)$ related to the right leg.

Figure 15:
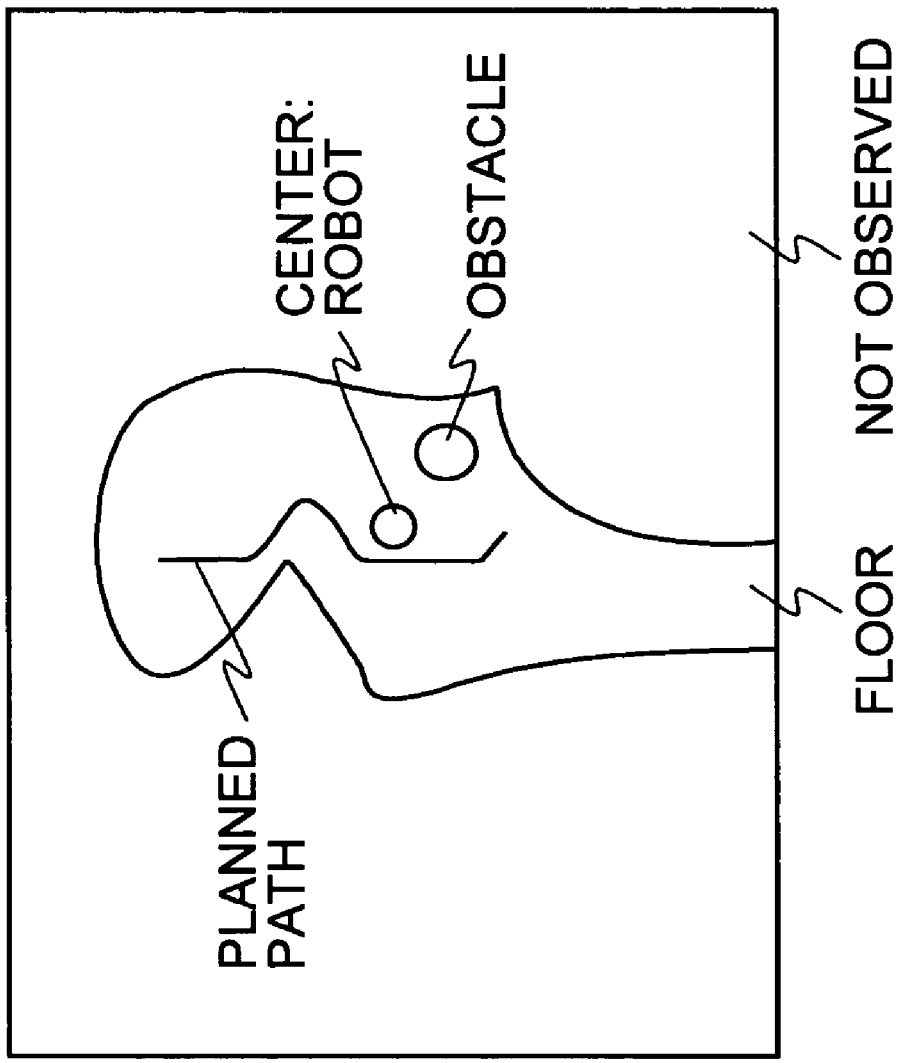
FIG. 15 is a schematic diagram illustrating combination of recognition results in FIG. 14.

FIG. 15 is a map of an obstacle environment showing recognition results, together with a movement path, in the world coordinate system. The recognition results are provided by recognizing a floor on the basis of whether or not there is a boundary between a wall and the floor, by recognizing an obstacle by a similar image processing operation, and by updating two-dimensional grid information randomly on the basis of distance data at each time by these recognition results. In the planned path, the robot moves so as to avoid such an obstacle, and, in the state shown in FIG. 14, the robot has moved partway through the planned path. In this task, observations are made while moving and are combined in a time direction. Therefore, although observation results included an error of one pace at most by a related method, these observation results can be precisely expressed, so that a proper recognition is achieved.

In the case in which the reference coordinate system is set to the world coordinate system, when coordinate transformation is performed on the recognition results, the number of computations increases, but it is not necessary to multiply an inverse matrix to the recorded and held recognition results related to switching of a on-floor leg, so that the same advantages as those of the first embodiment can be provided by simplifying the processing operation accordingly.

In such processing, it is possible for the recognition results to be expressed in terms of the world coordinate system, and to transform the recognition results expressed in terms of the world coordinate system to those expressed in terms of a local coordinate system having an on-floor foot as a reference when the movement describing section is notified of the recognition results.

(3) Third Embodiment

Although, in the above-described embodiments, the present invention is applied to changes in orientation caused by biped walking, the present invention is not limited thereto. The present invention may be applied to various other types of changes in orientation, such as, changes in orientation caused by sitting with bent legs, as shown in FIG. 16. The example shown in FIG. 16 is one in which an orientation change occurs from a state in which the soles are on the floor when the robot is sitting with bent legs (FIG. 16(A)) to a state in which the soles are not on the floor (FIG. 16(B)). In this case, with the bottom, which is the part of the robot that is most stably in contact with the floor when the robot is sitting with the legs bent, being defined as a floor contact point, the forward kinematics from the soles to the bottom is solved when the orientation changes in order to determine the movement amount and inform the robot of this determined movement amount. In contrast, it is possible to combine observations by exactly the same method even at the combining section by similarly returning to the combining section the change in orientation from the floor contact point of the bottom. In other words, it is possible to combine recognition results prior to the orientation change and those after the orientation change.

Figure 17:
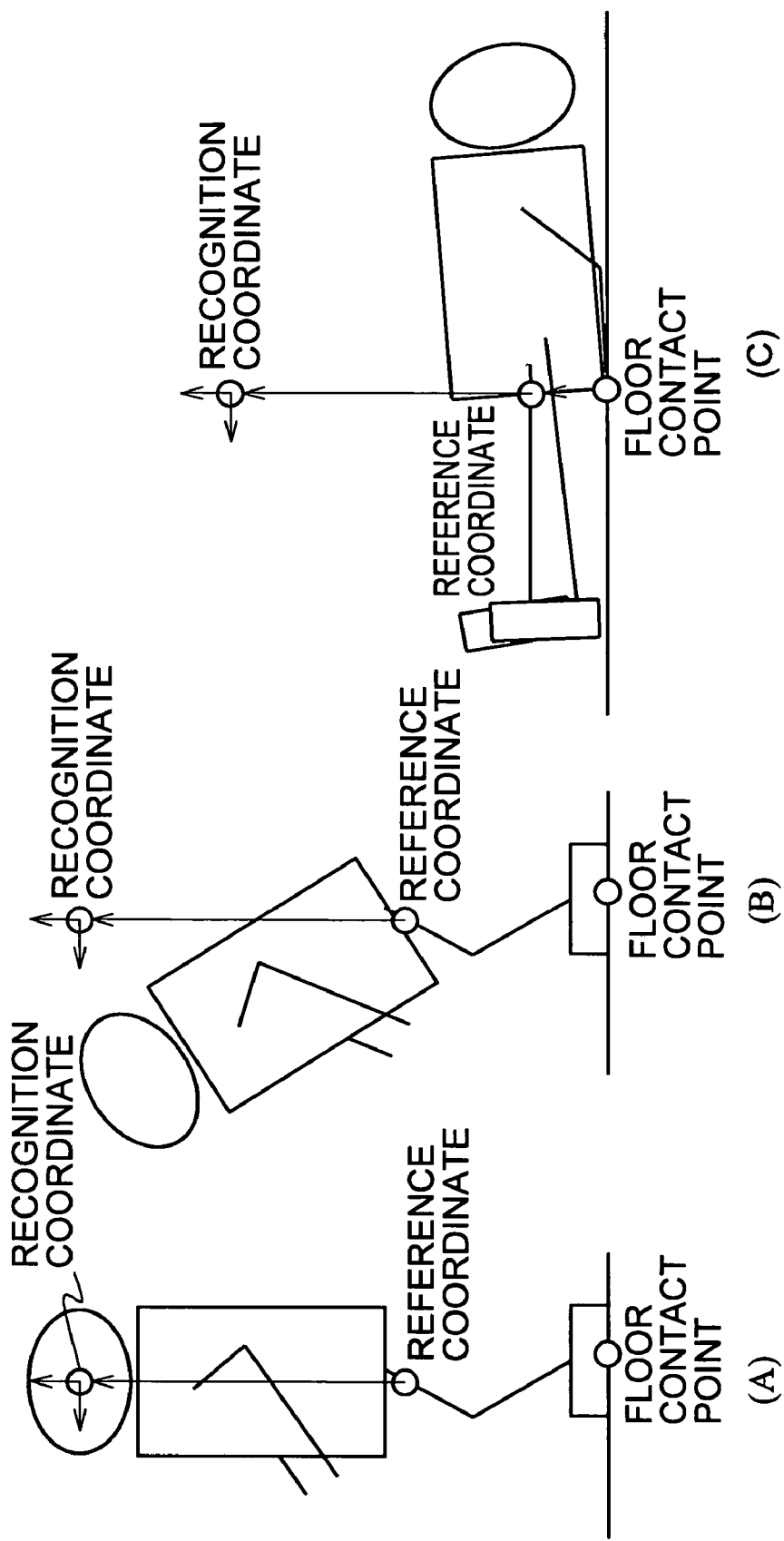
FIGS. 17(A), 17(B), and 17(C) are schematic diagrams illustrating another example of coordinate transformation.

The present invention may be not only applied to switching of a floor contact position simply on the basis of a weight placement location, but also variously applied to, for example, changes in the floor contact position due to various other changes in orientations, such as a standing orientation, a bowing orientation, and a sleeping orientation, as shown in FIGS. 17(A) to 17(C), respectively. Even in these cases, recognition results prior to an orientation change and those after the orientation change can be combined.

Although, in the above-described embodiments, the soles of the on-floor legs and the world coordinate system are set as reference coordinates in order to perform coordinate transformation, the present invention is not limited thereto. Therefore, the present invention is widely applicable to, for example, expressing recognition results by a body reference point of the robot.

Although, in the above-described embodiments, coordinate transformation performed on past recorded observation results due to switching of the floor contact point is discussed, the present invention is not limited thereto. Therefore, such a coordinate transformation can be set at various timings as required, such as when the observation results are processed.

Although, in the above-described embodiments, the present invention is applied to a biped walking robot, the present invention is not limited thereto. Therefore, the present invention may be widely applied to, for example, a quadrupedal walking robot.

The present invention makes it possible to precisely express an observation robot compared to related robots.

INDUSTRIAL APPLICABILITY

The present invention relates to a robot apparatus and a method for controlling the robot apparatus, and is applicable to, for example, a legged mobile robot.

The invention claimed is:

1. A robot apparatus comprising:
   a main body;
   a plurality of movable portions connected to the main body;
   a reference coordinate system disposed at the main body;
   a first local coordinate system disposed at a first floor contact position where one of the movable portions contacts a floor;
   first movement amount calculating means for calculating a movement amount of the reference coordinate system on the basis of the first local coordinate system;
   a second local coordinate system disposed at a second floor contact position where another one of the movable portions contacts the floor;
   second movement amount calculating means for calculating a movement amount of the reference coordinate system on the basis of the second local coordinate system; and
   calculating means for calculating the distance between the first local coordinate system and the second local coordinate system,
   wherein a movement amount of the reference coordinate system is calculated on the basis of the movement amount of the reference coordinate system based on the first local coordinate system, the movement amount of the reference coordinate system based on the second local coordinate system, and the distance between the local coordinate systems.

2. The robot apparatus according to claim 1, further comprising:
   a sensor movable portion disposed at the main body;
   a sensor, disposed at the sensor movable portion, for measuring an object;
   a sensor coordinate system disposed at the sensor; and
   sensor coordinate transforming means for performing a coordinate transformation between the sensor coordinate system and the reference coordinate system, the sensor coordinate transforming means correcting a coordinate of a measured value provided by the sensor on the basis of the movement amount of the reference coordinate system.

3. The robot apparatus according to claim 2, wherein a result of correction of the coordinate of the measured value is recorded and held, and the sensor coordinate transforming means performs the coordinate transformation on the recorded and held correction result so as to be in correspondence with a result of correction of the coordinate obtained after floor contact at the second floor contact position in response to switching from the first floor contact position to the second floor contact position.

4. A robot apparatus in which a dynamic change occurs between floor landing positions by an orientation change, the robot apparatus comprising:
   observing means for observing an outside environment via an outside observation sensor and outputting an observation result by a sensor coordinate system corresponding to the outside observation sensor;
   orientation detecting sensors for detecting the angles of joints involved in the orientation change among at least joints disposed from the outside observation sensor to the floor landing positions;
   floor landing detecting means for detecting switching between the floor landing positions; and
   coordinate transforming means for transforming a coordinate of the observation result obtained from the observing means to a coordinate of a predetermined reference coordinate system,
   wherein the observing means successively outputs the coordinate of the observation result changing by the orientation change along with time information, and
   wherein the coordinate transforming means detects a movement amount with respect to the floor landing position changing by the orientation change from the results of detection by the orientation detecting sensors with reference to the time information of the observation result and transforms the coordinate of the observation result to the coordinate of the reference coordinate system by correction by the movement amount in order to switch the floor landing position used for the detection of the movement amount as a result of the detection of the switching between the floor landing positions by the floor landing detecting means.

5. The robot apparatus according to claim 4, wherein the dynamic change between the floor landing positions by the orientation change is a change between the floor landing positions of the left and right feet used in bipedal walking, the orientation detecting sensors are angle sensors disposed at joints of the left and right feet, and the floor landing detecting means are weight placement sensors for detecting weight placement values on the left and right feet and are means for evaluating the difference between the weight placement values detected by the weight placement sensors by a predetermined threshold value.

6. The robot apparatus according to claim 4, wherein the coordinate transforming means records and holds a result of the coordinate transformation and transforms the recorded and held coordinate transformation result so as to correspond to the switching between the floor landing positions when the switching between the floor landing positions by the floor landing detecting means is detected.

7. The robot apparatus according to claim 6, further comprising movement describing means for combining coordinate transformation results recorded and held by the coordinate transforming means in order to reflect the combined result in a movement.

8. The robot apparatus according to claim 5, wherein the reference coordinate system is a self center coordinate system in which the soles of the left and right feet serve as references.

9. The robot apparatus according to claim 4, wherein the reference coordinate system is a world coordinate system.

10. A robot apparatus comprising:
a trunk;
a plurality of movable legs connected to the trunk;
a reference coordinate system disposed at the trunk;
a first local coordinate system disposed at a first floor contact position where one of the movable legs contacts a floor;
first movement amount calculating means for calculating a movement amount of the reference coordinate system on the basis of the first local coordinate system;
a second local coordinate system disposed at a second floor contact position where another one of the movable legs contacts the floor;
second movement amount calculating means for calculating a movement amount of the reference coordinate system on the basis of the second local coordinate system; and
calculating means for calculating the distance between the first local coordinate system and the second local coordinate system,
wherein a movement amount of the reference coordinate system is successively calculated on the basis of the movement amount based on the first local coordinate system, the movement amount based on the second local coordinate system, and the distance between the local coordinate systems due to switching between the movable legs that contact the floor.

11. A method for controlling a robot apparatus comprising a main body and a plurality of movable portions connected to the main body, the method comprising:
a first movement amount calculating step for calculating a movement amount of a reference coordinate system disposed at the main body on the basis of a first local coordinate system disposed at a first floor contact position where one of the movable portions contacts a floor;
a second movement amount calculating step for calculating a movement amount of the reference coordinate system on the basis of a second local coordinate system disposed at a second floor contact position where another one of the movable portions contacts the floor; and
a distance calculating step for calculating the distance between the first local coordinate system and the second local coordinate system,
wherein a movement amount of the reference coordinate system is calculated on the basis of the movement amount of the reference coordinate system based on the first local coordinate system, the movement amount of the reference coordinate system based on the second local coordinate system, and the distance between the local coordinate systems.

12. The method for controlling a robot apparatus according to claim 11, wherein the robot apparatus further comprises a sensor movable portion disposed at the main body and a sensor disposed at the sensor movable portion for measuring an object, and wherein the method further comprises a sensor coordinate transforming step for performing a coordinate transformation between a sensor coordinate system disposed at the sensor and the reference coordinate system and for correcting a coordinate of a measured value provided by the sensor on the basis of the movement amount of the reference coordinate system.

13. The method for controlling a robot apparatus according to claim 12, wherein a result of correction of the coordinate of the measured value is recorded and held, and the sensor coordinate transforming step comprises performing the coordinate transformation on the recorded and held correction result so as to be in correspondence with a result of correction of the coordinate obtained after floor contact at the second floor contact position in response to switching from the first floor contact position to the second floor contact position.

14. A method for controlling a robot apparatus in which a dynamic change occurs between floor landing positions by an orientation change, the method comprising:
observing step for observing an outside environment via an outside observation sensor and outputting an observation result by a sensor coordinate system corresponding to the outside observation sensor;
floor landing detecting step for detecting switching between the floor landing positions; and
coordinate transforming step for transforming a coordinate of the observation result obtained by the observing step to a coordinate of a predetermined reference coordinate system,
wherein the observing step comprises successively outputting the coordinate of the observation result changing by the orientation change along with time information, and
wherein the coordinate transforming step comprises detecting a movement amount between the floor landing positions changing by the orientation change from results of detection from orientation detecting sensors with reference to the time information of the observation result and transforming the coordinate of the observation result to the coordinate of the reference coordinate system by correction by the movement amount in order to switch the floor landing position used for the detection of the movement amount as a result of the detection of the switching between the floor landing positions by the floor landing detecting step, the orientation detecting sensors detecting the angles of joints involved in the orientation change among at least joints disposed from the outside observation sensor to the floor landing positions.

15. The method for controlling a robot apparatus according to claim 14, wherein the dynamic change between the floor landing positions by the orientation change is a change between the floor landing positions of the left and right feet used in bipedal walking, the orientation detecting sensors are angle sensors disposed at joints of the left and right feet, and the floor landing detecting step comprises evaluating the difference between weight placement values detected by weight placement sensors by a predetermined threshold value, the weight placement sensors detecting the weight placement values on the left and right feet.

16. The method for controlling a robot apparatus according to claim 15, wherein the reference coordinate system is a self center coordinate system in which the soles of the left and right feet serve as references.

17. The method for controlling a robot apparatus according to claim 14, wherein the coordinate transforming step comprises recording and holding a result of the coordinate transformation and transforming the recorded and held coordinate transformation result so as to correspond to the switching between the floor landing positions when the switching between the floor landing positions is detected by the floor landing detecting means.

18. The method for controlling a robot apparatus according to claim 17, further comprising movement describing step for combining coordinate transformation results recorded and held by the coordinate transforming step in order to reflect the combined result in a movement.

19. The method for controlling a robot apparatus according to claim 14, wherein the reference coordinate system is a world coordinate system.

20. A method for controlling a robot apparatus comprising a trunk and a plurality of movable legs connected to the trunk, the method comprising:

first movement amount calculating step for calculating a movement amount of a reference coordinate system disposed at the trunk on the basis of a first local coordinate system disposed at a first floor contact position where one of the movable legs contacts a floor;

second movement amount calculating step for calculating a movement amount of the reference coordinate system on the basis of a second local coordinate system disposed at a second floor contact position where another one of the movable legs contacts the floor; and distance calculating step for calculating the distance between the first local coordinate system and the second local coordinate system, wherein a movement amount of the reference coordinate system is successively calculated on the basis of the movement amount based on the first local coordinate system, the movement amount based on the second local coordinate system, and the distance between the local coordinate systems due to switching between the movable legs that contact the floor.

\* \* \* \* \*